(12) United States Patent
Sugisawa

(10) Patent No.: US 10,312,695 B2
(45) Date of Patent: Jun. 4, 2019

(54) POWER SOURCE CONTROL DEVICE AND POWER SOURCE CONTROL METHOD

(71) Applicants: AutoNetworks Technologies, Ltd., Yokkaichi (JP); Sumitomo Wiring Systems, Ltd, Suzuka (JP); Sumitomo Electric Industries, Ltd., Osaka (JP)

(72) Inventor: Yuuki Sugisawa, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 142 days.

(21) Appl. No.: 15/124,747

(22) PCT Filed: Aug. 29, 2014

(86) PCT No.: PCT/JP2014/072805
§ 371 (c)(1),
(2) Date: Sep. 9, 2016

(87) PCT Pub. No.: WO2015/145805
PCT Pub. Date: Oct. 1, 2015

(65) Prior Publication Data
US 2017/0077712 A1   Mar. 16, 2017

(30) Foreign Application Priority Data
Mar. 27, 2014   (JP) .................................. 2014-066639

(51) Int. Cl.
*H02J 4/00* (2006.01)
*H05B 33/08* (2006.01)
(Continued)

(52) U.S. Cl.
CPC .................. *H02J 4/00* (2013.01); *H02M 1/08* (2013.01); *H02M 1/32* (2013.01); *H02M 1/44* (2013.01);
(Continued)

(58) Field of Classification Search
CPC .. H02J 4/00; H02M 1/08; H02M 1/32; H02M 1/44; H02M 3/157; H02M 2001/0009;
(Continued)

(56) References Cited

U.S. PATENT DOCUMENTS 5,898,329 A    4/1999   Hopkins
7,602,166 B1  10/2009   Kang
(Continued)

FOREIGN PATENT DOCUMENTS

JP    2002043910 A    2/2002
JP    2006288104 A    4/2005
(Continued)

OTHER PUBLICATIONS

Search Report for European Application No. 14887378.9, dated Mar. 13, 2017, 9 pp.

*Primary Examiner* — Hal Kaplan
(74) *Attorney, Agent, or Firm* — Honigman LLP

(57) ABSTRACT

Provided is a power source control device that realizes multi-channel PWM control without using a timer port, and a power source control method for the same. A power source control device performs PWM control on a plurality of power source units that repeat an ON operation and an OFF operation in cycles having a predetermined PWM period. The power source control device includes: a generation unit configured to generate operation data for the entire PWM period, the operation data determining whether to cause the individual power source units to perform the ON operation or the OFF operation in cycles having a predetermined (Continued)

period that is shorter than the PWM period; and an output unit configured to output operation data generated by the generation unit to the plurality of power source units in cycles of the predetermined period.

10 Claims, 36 Drawing Sheets

(51) Int. Cl.
*H05B 37/02* (2006.01)
*H02M 1/44* (2007.01)
*H02M 3/157* (2006.01)
*H02M 1/08* (2006.01)
*H02M 1/32* (2007.01)
*H02M 1/00* (2006.01)

(52) U.S. Cl.
CPC ........ *H02M 3/157* (2013.01); *H05B 33/0815* (2013.01); *H05B 37/02* (2013.01); *H02M 2001/008* (2013.01); *H02M 2001/0009* (2013.01); *H05B 33/0827* (2013.01)

(58) Field of Classification Search
CPC ......... H02M 2001/008; H05B 33/0815; H05B 33/0827; H05B 37/02
USPC ......................................................... 307/24
See application file for complete search history.

(56) References Cited

U.S. PATENT DOCUMENTS

| | | |
|---|---|---|
| 2004/0008016 A1 | 1/2004 | Sutardja et al. |
| 2005/0151571 A1 | 7/2005 | Brown et al. |
| 2005/0180499 A1 | 8/2005 | Hsu |
| 2006/0220469 A1 | 10/2006 | Goto et al. |
| 2010/0301764 A1 | 12/2010 | Liu |
| 2011/0121761 A1 | 5/2011 | Zhao |
| 2012/0001557 A1 | 1/2012 | Hagino et al. |

FOREIGN PATENT DOCUMENTS

| | | |
|---|---|---|
| JP | 2006042598 A | 2/2006 |
| JP | 2013-255402 A | 12/2013 |
| JP | 2013254402 A | 12/2013 |
| JP | 2013255401 A | 12/2013 |
| JP | 2014054145 A | 3/2014 |
| WO | 2006/0023427 A2 | 3/2006 |

| TIMER INTERRUPT PERIOD / PORT REGISTER BIT POSITION | T1 | T2 | T3 | T4 |
|---|---|---|---|---|
| 0 | 1 | 1 | 0 | 0 |
| 1 | 0 | 1 | 1 | 0 |
| 2 | 0 | 0 | 1 | 1 |
| 3 | 1 | 0 | 0 | 1 |

FIG. 3

| PORT REGISTER BIT POSITION \ TIMER INTERRUPT PERIOD | T1 | T2 | T3 | T4 |
|---|---|---|---|---|
| 0 | 1 | 1 | 1 | 0 |
| 1 | 0 | 1 | 1 | 1 |
| 2 | 1 | 0 | 1 | 1 |
| 3 | 1 | 1 | 0 | 1 |

PWM DATA GENERATION BUFFER TABLE

| data num | 0 | 1 | 2 | 3 | 4 | 5 | 6 | 7 | 8 | 9 | 10 | 11 | 12 | 13 | ... | 97 | 98 | 99 | 100 | 101 | 102 | 103 | 104 | 105 | 106 | 107 | 108 | 109 | 110 | 111 | 112 | 113 |
|---|---|---|---|---|---|---|---|---|---|---|---|---|---|---|---|---|---|---|---|---|---|---|---|---|---|---|---|---|---|---|---|---|
| PORT0 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT1 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT2 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT3 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT4 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT5 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT6 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT7 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| [hex] | 00 | 00 | 00 | 00 | 00 | 00 | 00 | 00 | 00 | 00 | 00 | 00 | 00 | 00 | | 00 | 00 | 00 | 00 | 00 | 00 | 00 | 00 | 00 | 00 | 00 | 00 | 00 | 00 | 00 | 00 | 00 |

DUTY RESOLUTION NUMBER | PHASE SHIFT EXCESSIVE PORTION

FIG. 10B

| data num | 0 | 1 | 2 | 3 | 4 | 5 | 6 | 7 | 8 | 9 | 10 | 11 | 12 | 13 | ... | 97 | 98 | 99 | 100 | 101 | 102 | 103 | 104 | 105 | 106 | 107 | 108 | 109 | 110 | 111 | 112 | 113 |
|---|---|---|---|---|---|---|---|---|---|---|---|---|---|---|---|---|---|---|---|---|---|---|---|---|---|---|---|---|---|---|---|---|
| PORT0 | 1 | 1 | 1 | 1 | 1 | 1 | 1 | 1 | 1 | 1 | 1 | 1 | 1 | 1 | | 0 | 0 | 0 | 0 | 0 | 0 | 0 | 0 | 0 | 0 | 0 | 0 | 0 | 0 | 0 | 0 | 0 |
| PORT1 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| PORT2 | 0 | 0 | 0 | 0 | 0 | 0 | 0 | 0 | 0 | 0 | 0 | 0 | 0 | 0 | | 1 | 1 | 0 | 0 | 0 | 0 | 0 | 0 | 0 | 0 | 0 | 0 | 0 | 0 | 0 | 0 | 0 |
| PORT3 | 0 | 0 | 0 | 0 | 0 | 0 | 0 | 0 | 1 | 1 | 1 | 1 | 1 | 1 | | 1 | 1 | 1 | 1 | 1 | 0 | 0 | 0 | 0 | 0 | 0 | 0 | 0 | 0 | 0 | 0 | 0 |
| PORT4 | 1 | 1 | 0 | 0 | 1 | 0 | 0 | 0 | 0 | 0 | 0 | 1 | 1 | 1 | | 1 | 1 | 0 | 0 | 0 | 1 | 0 | 0 | 0 | 0 | 0 | 0 | 0 | 0 | 0 | 0 | 0 |
| PORT5 | 0 | 0 | 0 | 0 | 0 | 0 | 0 | 0 | 0 | 0 | 0 | 0 | 0 | 0 | | 1 | 1 | 1 | 1 | 1 | 0 | 1 | 1 | 1 | 1 | 0 | 0 | 0 | 0 | 0 | 0 | 0 |
| PORT6 | 1 | 1 | 1 | 1 | 1 | 1 | 0 | 0 | 1 | 1 | 1 | 1 | 1 | 1 | | 1 | 1 | 1 | 1 | 1 | 1 | 0 | 0 | 0 | 1 | 0 | 0 | 0 | 0 | 0 | 0 | 0 |
| PORT7 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 |
| [hex] | 51 | 41 | 41 | 41 | 45 | 5 | 5 | 5 | 15 | 15 | 15 | 55 | 55 | 55 | | 55 | 55 | 50 | 50 | 50 | 50 | 40 | 40 | 40 | 40 | 0 | 0 | 0 | 0 | 0 | 0 | 0 |

FIG. 10C

Replacement Sheet
PWM DATA GENERATION BUFFER TABLE 52

|        | T1 | T2 | T3 | T4 | T5 | T6 | T7 | T8 | T9 | T10 |
|--------|----|----|----|----|----|----|----|----|----|-----|
| PORT 0 | 0  | 0  | 0  | 1  | 1  | 1  | 1  | 1  | 0  | 0   |
| PORT 1 | 0  | 0  | 0  | 1  | 1  | 1  | 1  | 1  | 0  | 0   |
| PORT 2 | 0  | 0  | 0  | 1  | 1  | 1  | 1  | 1  | 0  | 0   |
| PORT 3 | 0  | 0  | 0  | 1  | 1  | 1  | 1  | 1  | 0  | 0   |

FIG. 13

PORT DRIVING DATA

| PORT 0 | 1 |
|--------|---|
| PORT 1 | 1 |
| PORT 2 | 1 |
| PORT 3 | 1 |

FIG. 14

PWM DATA GENERATION BUFFER TABLE 52

|  | T1 | T2 | T3 | T4 | T5 | T6 | T7 | T8 | T9 | T10 |
|---|---|---|---|---|---|---|---|---|---|---|
| PORT 0 | 1 | 1 | 1 | 1 | 1 | 1 | 0 | 0 | 0 | 0 |
| PORT 1 | 0 | 1 | 1 | 1 | 1 | 1 | 1 | 0 | 0 | 0 |
| PORT 2 | 0 | 0 | 1 | 1 | 1 | 1 | 1 | 1 | 0 | 0 |
| PORT 3 | 0 | 0 | 0 | 1 | 1 | 1 | 1 | 1 | 1 | 0 |

LEADING PHASE SHIFT PORTION 521    NO-PHASE-SHIFT PORTION 522    TRAILING PHASE SHIFT PORTION 523

FIG. 16

PHASE SHIFT DATA

|  | 0 | 1 | 2 |
|---|---|---|---|
| PORT 0 | 1 | 1 | 1 |
| PORT 1 | 0 | 1 | 1 |
| PORT 2 | 0 | 0 | 1 |
| PORT 3 | 0 | 0 | 0 |

FIG. 17A

INVERTED PHASE SHIFT DATA

|        | 0 | 1 | 2 |
|--------|---|---|---|
| PORT 0 | 0 | 0 | 0 |
| PORT 1 | 1 | 0 | 0 |
| PORT 2 | 1 | 1 | 0 |
| PORT 3 | 1 | 1 | 1 |

FIG. 17B

PWM DATA GENERATION BUFFER TABLE 52

|        | T1 | T2 | T3 | T4 | T5 | T6 | T7 | T8 | T9 | T10 |
|--------|----|----|----|----|----|----|----|----|----|-----|
| PORT 0 | 1  | 1  | 1  | 1  | 1  | 1  | 1  | 0  | 0  | 0   |
| PORT 1 | 0  | 1  | 1  | 1  | 1  | 1  | 1  | 1  | 0  | 0   |
| PORT 2 | 0  | 0  | 1  | 1  | 1  | 1  | 1  | 1  | 1  | 0   |
| PORT 3 | 0  | 0  | 0  | 1  | 1  | 1  | 1  | 1  | 1  | 1   |

LEADING PHASE SHIFT PORTION 521 — NO-PHASE-SHIFT PORTION 522 — TRAILING PHASE SHIFT PORTION 523

FIG. 19

PWM DATA GENERATION BUFFER TABLE 52

|        | T1 | T2 | T3 | T4 | T5 | T6 | T7 | T8 | T9 | T10 |
|--------|----|----|----|----|----|----|----|----|----|-----|
| PORT 0 | 1  | 1  | 0  | 0  | 0  | 0  | 0  | 0  | 0  | 0   |
| PORT 1 | 0  | 1  | 1  | 0  | 0  | 0  | 0  | 0  | 0  | 0   |
| PORT 2 | 0  | 0  | 1  | 1  | 0  | 0  | 0  | 0  | 0  | 0   |
| PORT 3 | 0  | 0  | 0  | 1  | 1  | 0  | 0  | 0  | 0  | 0   |

FIG. 25

| data num | 0 | 1 | 2 | 3 | 4 | 5 | 6 | 7 | 8 | 9 | 10 | 11 | 12 | 13 | 14 | 15 | 16 | 17 | 18 | 19 | 20 | | 91 | 92 | 93 | 94 | 95 | 96 | 97 | 98 | 99 |
|---|---|---|---|---|---|---|---|---|---|---|---|---|---|---|---|---|---|---|---|---|---|---|---|---|---|---|---|---|---|---|---|
| PORT 0 | 1 | 1 | 1 | 1 | 1 | 1 | 1 | 1 | 1 | 1 | 1 | 1 | 1 | 1 | 1 | 1 | 1 | 1 | 1 | 1 | 1 | | 1 | 1 | 1 | 1 | 0 | 0 | 0 | 0 | 0 |
| PORT 1 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 | 0 | 0 | 1 | 1 | 1 | 1 | 1 | 1 |
| PORT 2 | 0 | 0 | 0 | 0 | 1 | 1 | 1 | 1 | 1 | 1 | 1 | 1 | 1 | 1 | 1 | 1 | 1 | 1 | 1 | 1 | 1 | | 1 | 1 | 0 | 0 | 0 | 0 | 0 | 0 | 0 |
| PORT 3 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 |
| PORT 4 | 1 | 1 | 1 | 0 | 0 | 0 | 0 | 0 | 1 | 1 | 1 | 1 | 1 | 1 | 1 | 1 | 1 | 1 | 1 | 1 | 1 | | 1 | 1 | 1 | 1 | 1 | 1 | 1 | 1 | 1 |
| PORT 5 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 |
| PORT 6 | 1 | 1 | 1 | 1 | 1 | 1 | 1 | 0 | 0 | 0 | 0 | 0 | 1 | 1 | 1 | 1 | 1 | 1 | 1 | 1 | 1 | | 1 | 1 | 1 | 1 | 1 | 1 | 1 | 1 | 1 |
| PORT 7 | 0 | 0 | 0 | 0 | 0 | 0 | 0 | 0 | 0 | 0 | 0 | 0 | 0 | 0 | 0 | 0 | 0 | 0 | 0 | 0 | 0 | | 0 | 0 | 0 | 0 | 0 | 0 | 0 | 0 | 0 |
| [hex] | 51 | 51 | 51 | 41 | 45 | 45 | 45 | 5 | 15 | 15 | 15 | 15 | 55 | 55 | 55 | 55 | 55 | 55 | 55 | 55 | 55 | | 55 | 55 | 55 | 55 | 54 | 54 | 54 | 54 | 50 |

PWM DATA THAT DRIVES PORTS 0, 2, 4, AND 6 WITH 95% DUTY RATIO, 1% DUTY RESOLUTION, AND 2% PHASE SHIFT AMOUNT BETWEEN PORTS

FIG. 26

PORT DRIVING DATA

| PORT 0 | 1 |
|---|---|
| PORT 1 | 0 |
| PORT 2 | 1 |
| PORT 3 | 0 |
| PORT 4 | 1 |
| PORT 5 | 0 |
| PORT 6 | 1 |
| PORT 7 | 0 |

FIG. 27

PHASE SHIFT DATA

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| PORT 0 | 1 | 1 | 1 | 1 | 1 | 1 | 1 | 1 | 1 | 1 | 1 | 1 | 1 | 1 |
| PORT 1 | 0 | 0 | 1 | 1 | 1 | 1 | 1 | 1 | 1 | 1 | 1 | 1 | 1 | 1 |
| PORT 2 | 0 | 0 | 0 | 0 | 1 | 1 | 1 | 1 | 1 | 1 | 1 | 1 | 1 | 1 |
| PORT 3 | 0 | 0 | 0 | 0 | 0 | 0 | 1 | 1 | 1 | 1 | 1 | 1 | 1 | 1 |
| PORT 4 | 0 | 0 | 0 | 0 | 0 | 0 | 0 | 0 | 1 | 1 | 1 | 1 | 1 | 1 |
| PORT 5 | 0 | 0 | 0 | 0 | 0 | 0 | 0 | 0 | 0 | 0 | 1 | 1 | 1 | 1 |
| PORT 6 | 0 | 0 | 0 | 0 | 0 | 0 | 0 | 0 | 0 | 0 | 0 | 0 | 1 | 1 |
| PORT 7 | 0 | 0 | 0 | 0 | 0 | 0 | 0 | 0 | 0 | 0 | 0 | 0 | 0 | 0 |

FIG. 28A

INVERTED PHASE SHIFT DATA

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| PORT 0 | 0 | 0 | 0 | 0 | 0 | 0 | 0 | 0 | 0 | 0 | 0 | 0 | 0 | 0 |
| PORT 1 | 1 | 1 | 0 | 0 | 0 | 0 | 0 | 0 | 0 | 0 | 0 | 0 | 0 | 0 |
| PORT 2 | 1 | 1 | 1 | 1 | 0 | 0 | 0 | 0 | 0 | 0 | 0 | 0 | 0 | 0 |
| PORT 3 | 1 | 1 | 1 | 1 | 1 | 1 | 0 | 0 | 0 | 0 | 0 | 0 | 0 | 0 |
| PORT 4 | 1 | 1 | 1 | 1 | 1 | 1 | 1 | 1 | 0 | 0 | 0 | 0 | 0 | 0 |
| PORT 5 | 1 | 1 | 1 | 1 | 1 | 1 | 1 | 1 | 1 | 1 | 0 | 0 | 0 | 0 |
| PORT 6 | 1 | 1 | 1 | 1 | 1 | 1 | 1 | 1 | 1 | 1 | 1 | 1 | 0 | 0 |
| PORT 7 | 1 | 1 | 1 | 1 | 1 | 1 | 1 | 1 | 1 | 1 | 1 | 1 | 1 | 1 |

POWER SOURCE CONTROL DEVICE AND POWER SOURCE CONTROL METHOD

CROSS-REFERENCE TO RELATED APPLICATIONS

This application is the U.S. national stage of PCT/JP2014/072805 filed Aug. 29, 2014, which claims priority of Japanese Patent Application No. JP 2014-066639 filed Mar. 27, 2014.

FIELD OF THE INVENTION

The present invention relates to a power source control device that performs PWM control on a plurality of power source units that repeat an ON operation and an OFF operation in cycles having a predetermined PWM period, and a power source control method for the same.

BACKGROUND

Voltage across an on-board power source varies depending on the status of loads, which may lead to a phenomenon in which lighting loads such as various kinds of lamps flicker. In view of this problem, for example, there is a disclosure of a power source control device for vehicles that detects voltage from an on-board power source, calculates a duty ratio from the detected voltage and a predetermined voltage, performs pulse width modulation (PWM) control on the voltage from the on-board power source, using the duty ratio thus calculated, and then supplies the voltage to the lighting loads (see JP 2013-255402A).

In PWM control, brightness maintaining control is performed on the lighting loads, using a timer signal output from a timer port that is provided in a microcomputer (or microprocessor). Power supply to the lighting loads is controlled by using an intelligent power device (IPD). The IPD has a monitor terminal for current flowing to the lighting loads, and detects current to the lighting loads using a microcomputer. Information regarding the detected current is used for protecting the lighting loads and the wire harness, and detecting disconnection.

FIG. 31 is a block diagram showing a first example of a power source control device that performs conventional PWM control using a microcomputer. As shown in FIG. 31, the power source control device is provided with a given number of IPDs, the given number corresponding to the number of lighting loads. The microcomputer is provided with a PWM period timer, and a given number of DUTY timers, the given number corresponding to the number of IPDs. The microcomputer outputs an ON/OFF instruction (a PWM signal) from each of the DUTY timers to the corresponding IPD. In the example shown in FIG. 31, the number of timer ports required is the same as the number of lighting loads that require brightness maintaining control. Generally, a microcomputer having a large number of timer ports is expensive, and it is difficult to achieve cost reduction.

Also, in a configuration in which only one PWM period timer is provided as shown in FIG. 31, there is a problem in that the phases of the lighting loads in the PWM control coincide, the IPDs are caused to perform the ON operation at the same time, inrush current flowing to the lighting loads increases, and noise (conduction noise or radiation noise) increases.

FIG. 32 is a block diagram showing a second example of a power source control device that performs conventional PWM control using a microcomputer. In the example shown in FIG. 32, a PWM period timer is provided for each IPD, and it is possible to shift (displace) the phases of the lighting loads from one another. Therefore, it is possible to suppress inrush current flowing to the lighting loads, and reduce noise (conduction noise or radiation noise). However, timers for phase shifting are also required, and it is further difficult to achieve cost reduction.

Furthermore, since phase shifting is performed, the timing at which the IPD is caused to perform the ON operation is different for each lighting load. In order to detect output current flowing to the lighting loads, it is necessary to detect the current during the period in which the IPDs are ON. However, since the microcomputer is not in synchronization with the PWM period timer, it is impossible to know when the respective IPDs are ON. Therefore, an additional circuit is required in order to notify the microcomputer of the time each IPD is ON (the time AD conversion for current detection is performed).

FIG. 33 is a time chart showing an example of conventional PWM control using a microcomputer. The chart in FIG. 33 shows, from top to bottom, ON/OFF of a load driving instruction that is externally provided, a DUTY timer register value that is based on the load driving instruction (the value of the duty ratio that is externally provided), a period timer, a DUTY timer count value, and an output waveform. As shown in FIG. 33, it is assumed that the load driving instruction is switched from OFF to ON and the duty ratio is updated from 0% to 50%. If the load driving instruction (duty ratio update) is received from an external ECU, usually, the DUTY update for the timer port is reflected in the next PWM period after the duty ratio has been updated. Therefore, there is the problem that it is impossible, even if necessary, to light up a lighting device immediately after an instruction to light up the lighting device is received from an external ECU, and a delay time corresponding to one PWM period at the maximum occurs.

The present invention has been made in view of the above-described situation, and aims to provide a power source control device that realizes multi-channel PWM control without using a timer port, and a power source control method for the same.

SUMMARY OF INVENTION

A power source control device according to one aspect of the present invention is a power source control device that performs PWM control on a plurality of power source units that repeat an ON operation and an OFF operation in cycles having a predetermined PWM period, the power source control device including: a generation unit configured to generate operation data for the entire PWM period, the operation data determining whether to cause the individual power source units to perform the ON operation or the OFF operation in cycles having a predetermined period that is shorter than the PWM period; and an output unit configured to output the operation data generated by the generation unit to the plurality of power source units in cycles of the predetermined period.

A power source control method according to one aspect of the present invention is a power source control method for performing PWM control on a plurality of power source units that repeat an ON operation and an OFF operation in cycles having a predetermined PWM period, the power source control method comprising the steps of: generating operation data for the entire PWM period, the operation data determining whether to cause the individual power source units to perform the ON operation or the OFF operation in cycles having a predetermined period that is shorter than the PWM period; and outputting operation data thus generated to the plurality of power source units in cycles of the predetermined period.

According to one aspect of the present invention, the generation unit is configured to generate operation data for the entire PWM period, the operation data determining whether to cause the individual power source units to perform the ON operation or the OFF operation in cycles having a predetermined period that is shorter than the PWM period. The PWM period is the period of cycles in which the individual power source units repeat an ON operation and an OFF operation. The ratio of the ON operation time to the PWM period is the duty ratio of the PWM control. The predetermined periods are periods obtained by dividing the PWM period by a required number (a number corresponding to the duty resolution, for example). If the PWM period is 100 Hz, one PWM period is 10 ms, and if the duty resolution is 1%, the PWM period is divided into one hundred sections, and therefore the predetermined period is 10 ms/100=100 μs. The operation data is defined for each cycle of the predetermined period. If there is one set of operation data for each cycle of the predetermined period, one hundred sets of operation data are generated for the PWM period. Each set of operation data determines whether to cause the plurality of power source units to perform the ON operation or the OFF operation. Therefore, if there are eight power source units, one set of operation data includes eight data pieces or bits (e.g. information of eight bits) corresponding to the number of power source units. In this case, there are eight hundred (8×100) operation data bits for one PWM period.

The output unit is configured to output the operation data generated by the generation unit to the plurality of power source units in cycles of the predetermined period. In the above-described example, the output unit outputs the operation data set (data of eight bits corresponding to the eight power source units) to the power source units every 100μ. For example, the operation data of the $0^{th}$ bit is output to the $1^{st}$ power source unit, the operation data of the $1^{st}$ bit is output to the $2^{nd}$ power source unit, and so on, up to the operation data of the $7^{th}$ bit that is output to the $8^{th}$ power source unit. The operation data of each bit is binary data, which is "1" or "0". For example, "1" is a data bit that causes a power source unit to perform the ON operation, and "0" is a data bit that causes a power source unit to perform the OFF operation. Regarding a given power source unit, the output unit outputs an operation data bit "1" or "0" to the power source unit at each cycle of the predetermined period within the PWM period. The power source unit performs the ON operation while operation data bits "1" are successively output, and performs the OFF operation while operation data bits "0" are successively output. It is thus possible to subject the power source unit to PWM control. Thus, it is possible to simultaneously perform PWM control on the plurality of power source units, and it is possible to realize multi-channel PWM control without using a timer port.

The power source control device according to one aspect of the present invention further includes: a storage unit configured to store the operation data generated by the generation unit; and a transferring unit configured to transfer operation data that corresponds to the cycles of the predetermined period, out of the operation data stored in the storage unit, to the output unit in synchronization with the predetermined period.

According to this aspect of the present invention, the storage unit is configured to store the operation data generated by the generation unit. The transferring unit is configured to transfer operation data that corresponds to the cycles of the predetermined period, out of the operation data stored in the storage unit, to the output unit in synchronization with the predetermined period. The storage unit may be a memory such as a RAM, or a register. The output unit is configured with a port register, for example, and the transferring unit is a direct memory access (DMA). The timer outputs an interrupt signal to the DMA in synchronization with the predetermined period, and accordingly the DMA transfers the operation data set (one set of operation data) corresponding to the predetermined period from the memory to the port register. Thus, it is possible to realize multi-channel PWM control without using a timer port.

In the power source control device according to one aspect of the invention, the generation unit is configured to generate the operation data such that ordinal numbers of the cycles of the predetermined period within the PWM period, at which the individual power source units are respectively caused to perform the ON operation for the first time, are different from each other.

According to this aspect of the present invention, the generation unit is configured to generate the operation data such that ordinal numbers of the cycles of the predetermined period within the PWM period, at which the individual power source units are respectively caused to perform the ON operation for the first time, are different from each other. For example, as described above, if the PWM period is 100 Hz and the predetermined period is 100 μs, one PWM period is composed of one hundred predetermined periods. Here, it is assumed that the ordinal numbers of the cycles of the predetermined period are "$1^{st}$" to "$100^{th}$" in order from first to last. It is also assumed that the number of power source units is eight. It is also assumed that the $1^{st}$ power source unit is to be switched from OFF to ON at the $100^{th}$ predetermined period, the $2^{nd}$ power source unit is to be switched from OFF to ON at the $20^{th}$ predetermined period, and so on, up to the $8^{th}$ power source unit that is to be switched from OFF to ON at the $80^{th}$ predetermined period. In such a case, the power source units are each switched from OFF to ON at different time, and thus it is possible to realize phase shifting within a PWM period. With this configuration, it is possible to suppress inrush current and reduce noise (conduction noise or radiation noise) without using a timer port.

The power source control device according to one aspect of the present invention further includes: a voltage detection unit configured to detect a voltage applied to the plurality of power source units, wherein the generation unit is configured to increase or reduce the number of cycles of the predetermined period within the PWM period, at which the plurality of power source units are caused to perform the ON operation, depending on the voltage detected by the voltage detection unit.

According to this aspect of the present invention, the voltage detection unit is configured to detect a voltage applied to the plurality of power source units. For example, the voltage detection unit detects a voltage across a battery that supplies power to the plurality of power source units. The generation unit is configured to increase or reduce the number of cycles of the predetermined period within the PWM period, at which the plurality of power source units are caused to perform the ON operation, depending on the voltage detected by the voltage detection unit. If the number of cycles of the predetermined period during which power source units are caused to perform the ON operation is increased within a PWM period, the power source units perform the ON operation for a longer period, and the duty ratio can be increased. Also, if the number of cycles of the predetermined period at which the power source units are caused to perform the ON operation is reduced within a PWM period, the power source units perform the ON operation for a shorter period, and the duty ratio can be reduced. For example, when the power source voltage across the battery or the like decreases depending on the status of the power loads, the number of cycles of the predetermined period at which the power source units are caused to perform the ON operation within a PWM period is increased, and the duty ratio is thereby increased, in order to prevent the brightness of the lighting loads from decreasing. Consequently, it is possible to maintain the brightness of the lighting loads even when the power source voltage varies depending on the status of the loads.

The power source control device according to one aspect of the present invention further includes: an acquisition unit configured to acquire an instruction that specifies a duty ratio of the PWM control at a given cycle of the predetermined period within the PWM period, wherein the generation unit is configured to update operation data based on an instruction acquired by the acquisition unit, and the output unit is configured to output operation data that has been updated by the generation unit, at a cycle of the predetermined period that is subsequent to the given cycle.

According to this aspect of the present invention, the acquisition unit is configured to acquire an instruction that specifies a duty ratio of the PWM control, at a given cycle of the predetermined period within the PWM period. That is, the acquisition unit can acquire an instruction that specifies the duty ratio, at a given cycle of the predetermined period within the PWM period. The instruction that specifies the duty ratio is, for example, an instruction to switch a lighting load from OFF to ON, an instruction to change the duty ratio while a lighting load is being ON, and so on. The generation unit is configured to update the operation data based on an instruction acquired by the acquisition unit. For example, if the operation data is stored in the storage unit, the generation unit rewrites the operation data stored in the storage unit with operation data based on the new instruction. The output unit is configured to output operation data that has been updated by the generation unit, at a predetermined period that is later than the given cycle. The predetermined cycle that is later than a given predetermined cycle may be the predetermined cycle that is subsequent to the given predetermined cycle, or the cycle that is later than the given predetermined cycle by two periods or three periods. Consequently, the output unit can output the updated operation data without waiting until the subsequent cycle of the PWM period. Therefore, for example, it is possible to turn ON a lighting device immediately after an instruction to turn ON the lighting device is received from an external ECU.

The power source control device according to one aspect of the present invention further includes: a plurality of current detection units that are configured to detect currents that the plurality of power source units supply to corresponding loads; and a control unit that is configured to let the plurality of current detection units detect the currents at predetermined cycles, at which the plurality of power source units respectively perform the ON operation, based on the operation data generated by the generation unit.

According to this aspect of the present invention, the plurality of current detection units are configured to detect currents that the plurality of power source units supply to corresponding loads. The control unit is configured to let the plurality of current detection units detect the currents at predetermined cycles, at which the plurality of power source units respectively perform the ON operation, based on the operation data generated by the generation unit. The operation data is data that determines whether to cause the individual power source units to perform the ON operation or the OFF operation with respect to each predetermined period within the PWM period. Therefore, the control unit can determine when the individual power source units perform the ON operation, by referring to the operation data. Thus, it is possible to detect the current supplied to a load during the ON operation of the corresponding power source unit. Therefore, an additional circuit for detecting the ON timing of each of the power source units (the timing at which AD conversion for current detection is to be performed) is unnecessary.

In the power source control device according to one aspect of the present invention, the generation unit includes: a predetermined table; and a writing unit configured to organize the operation data into sets of data respectively corresponding to the predetermined period, and write the sets of operation data one after another into the table, and the power source control device is configured to store the operation table written into the table in the storage unit.

According to this aspect of the present invention, the generation unit includes: a predetermined table (also referred to as "buffer table for PWM data generation"); and a writing unit configured to organize the operation data into sets of data respectively corresponding to the predetermined period, and write the sets of operation data one after another into the table. The predetermined table is, for example, a buffer table used for generating operation data, and temporarily stores operation data before the generated operation data is stored in the storage unit, i.e., temporarily stores operation data that is being generated. If the duty resolution is 1%, one hundred predetermined periods are included in one PWM period. If the number of power source units (the number of ports) is eight, one set of operation data for each predetermined period includes eight data bits (e.g. information of eight bits). In this case, the predetermined table has a data capacity that is sufficient for recording at least 800 (8×100) data bits.

The writing unit writes one set of operation data into the buffer all at once for each predetermined period by performing one loop (repeating process). Therefore, for example, it is possible to write information of eight bits by performing one loop, and approximately one hundred loops are required to be performed to write all the operation data. Consequently, it is possible to reduce the processing time required for generating the operation data and to reduce the processing workload (the load relating to the processing), compared to the case in which approximately eight hundred data bits are sequentially written into the buffer and the loop is repeated approximately eight hundred times.

In the power source control device according to one aspect of the present invention, the generation unit further includes: a leading data generation unit that is configured to generate leading operation data for causing the plurality of power source units to perform an initial ON operation one after another in cycles of the predetermined period in a leading portion of the PWM period; a trailing data generation unit that is configured to generate trailing operation data for causing the plurality of power source units to perform an initial OFF operation one after another in cycles of the predetermined period in a trailing portion of the PWM period; and an intermediate data generation unit configured to generate intermediate operation data for causing the plurality of power source units to perform the ON operation in cycles of the predetermined period in an intermediate portion between the leading portion and the trailing portion, and the writing unit is configured to organize the leading operation data, the intermediate operation data, and the trailing operation data into sets of data respectively corresponding to the predetermined period, and write the sets of operation data one after another into the table.

According to this aspect of the present invention, the generation unit is configured to generate leading operation data for causing the plurality of power source units to perform an initial ON operation one after another in cycles of the predetermined period in a leading portion of the PWM period. Here, "leading portion" is, for example, a period from the first predetermined period to a given predetermined period in the PWM period. For example, it is assumed that there are four power source units, and the ports of the output unit that drive the power source units are referred to as "port 0", "port 1", "port 2", and "port 3". The data that causes a power source unit to perform the ON operation is "1", and the data that causes a power source unit to perform the OFF operation is "0". If it is assumed that the ordinal numbers of the cycles of the predetermined period of the leading operation data are "$1^{st}$", "$2^{nd}$", and so on in order from first to last, the leading operation data for the port 0 is "1", "1", and "1" in order of the predetermined periods, the leading operation data for the port 1 is "0", "1", and "1" in order of the predetermined periods, the leading operation data for the port 2 is "0", "0", and "1" in order of the predetermined periods, and the leading operation data for the port 3 is "0", "0", and "0" in order of the predetermined periods. That is, the leading operation data is operation data that causes the power source units to perform the ON operation one after another in cycles of the predetermined period, and is phase shift data that is data for shifting the timing (the predetermined period) at which each power source unit starts the ON operation in PWM control. Note that the leading operation data does not include a set of data that causes all the power source units to perform the ON operation at a given cycle of the predetermined period.

The trailing data generation unit is configured to generate trailing operation data for causing the plurality of power source units to perform an initial OFF operation one after another in cycles of the predetermined period in a trailing portion of the PWM period. Here, "trailing portion" is, for example, a period from a given predetermined period to the last predetermined period in the PWM period. For example, it is assumed that there are four power source units, and the ports of the output unit that drive the power source units are referred to as "port 0", "port 1", "port 2", and "port 3". The data that causes a power source unit to perform the ON operation is "1", and the data that causes a power source unit to perform the OFF operation is "0". If it is assumed that the ordinal numbers of the trailing operation data are "$1^{st}$", "$2^{nd}$", and so on in order from first to last, the trailing operation data for the port 0 is "0", "0", and "0" in order of the predetermined periods, the trailing operation data for the port 1 is "1", "0", and "0" in order of the predetermined periods, the trailing operation data for the port 2 is "1", "1", and "0" in order of the predetermined periods, and the trailing operation data for the port 3 is "1", "1", and "1" in order of the predetermined periods. That is, the trailing operation data is operation data that causes the power source units to perform the OFF operation one after another in cycles of the predetermined period. Note that the leading operation data does not include a set of data that causes all the power source units to perform the ON operation at a given predetermined period. That is, the trailing operation data is inverted phase shift data that is data for shifting the timing (the predetermined period) at which each power source unit starts the OFF operation in PWM control. The trailing operation data is data configured by inverting all "1"s and "0"s of the leading operation data.

The intermediate data generation unit is configured to generate intermediate operation data for causing the plurality of power source units to perform the ON operation in cycles of the predetermined period in an intermediate portion between the leading portion and the trailing portion. The intermediate portion is composed of the remaining predetermined periods when the leading portion and the trailing portion are excluded from the PWM period. That is, the intermediate operation data is operation data that causes the power source units to perform the ON operation throughout the predetermined periods. If all of the power source units are to be operated, all of the set of operation data for a given predetermined period indicate "1" for all of the ports. Note that the duty ratio is the ratio of the sum total of the cycles of the predetermined period at which the data out of the leading operation data, the intermediate operation data, and the trailing operation data indicate "1" for a given port, to the PWM period.

The writing unit is configured to organize the leading operation data, the intermediate operation data, and the trailing operation data into sets of data for respective predetermined periods, and write the sets of operation data one after another into the table. Consequently, the operation data for each predetermined period can be written by performing one loop, and it is possible to reduce the processing time required for generating the operation data and to reduce the processing workload (the load relating to the processing), compared to the case in which the operation data is sequentially written into the buffer one at a time (one bit at a time) and the loop is repeated.

In the power source control device according to one aspect of the present invention, the intermediate data generation unit is configured to adjust the number of cycles of the predetermined period included in the intermediate operation data in accordance with a duty ratio of the PWM control.

In this aspect of the present invention, the intermediate data generation unit is configured to adjust the number of cycles of the predetermined period included in the intermediate operation data in accordance with the duty ratio of the PWM control. In this way, it is possible to cause the power source units to operate with a desired duty ratio by increasing or decreasing the number of times a set of operation data corresponding to each predetermined period is written.

The power source control device according to one aspect of the present invention further includes: a period determination unit configured to determine whether or not a sum total of the cycles of the predetermined period included in the leading operation data, the intermediate operation data, and the trailing operation data is longer than the PMW period; and a logical disjunction calculation unit configured to, upon the period determination unit determining that the sum total of the cycles of the predetermined period is longer than the PWM period, calculate, for each predetermined period, a logical disjunction of the trailing operation data and the leading operation data that correspond to an excessive period by which the sum total is longer, in the order of the cycles of the predetermined period, wherein the leading data generation unit is configured to generate data obtained by the logical disjunction calculation unit as the leading operation data.

According to this aspect of the present invention, the period determination unit is configured to determine whether or not the sum total of the cycles of the predetermined period included in the leading operation data, the intermediate operation data, and the trailing operation data is longer than the PWM period. For example, it is assumed that the ports of the output unit are "port 0", "port 1", "port 2", and "port 3", and the duty resolution number is ten. The duty resolution number is the number of cycles of the predetermined period included in the PMW period. When the duty resolution number is ten, one PWM period includes ten predetermined periods. The ten predetermined periods are denoted as T1, T2, . . . , and T10, in order from first to last. Since there are four ports, the set of leading operation data and the set of trailing operation data each correspond to three predetermined periods.

If the duty ratio is 80%, with respect to a given port, the number of cycles of the predetermined period at which the data indicates "1" within the PWM period is eight. For example, with respect to the port 0, if the leading operation data is (1, 1, 1) and the trailing operation data is (0, 0, 0), it is necessary for the intermediate operation data corresponding to the port 0 to include five predetermined periods, i.e., the intermediate operation data needs to be (1, 1, 1, 1, 1), in order to achieve an 80% duty ratio. If this is the case, the total number of the cycles of the predetermined period included in the leading operation data, the intermediate operation data, and the trailing operation data is 11 (=3+5+3), and the total period is longer than the PWM period. In this case, the data for the port 0 corresponding to the respective predetermined periods is (1, 1, 1, 1, 1, 1, 1, 1, 0, 0, 0) (eleven data bits), and the data bit "0" corresponding to the last predetermined period is excessive. In this case, data corresponding to one predetermined period is excessive.

When phase shifting for each port is considered, with respect to the port 3 for example, if the leading operation data is (0, 0, 0) and the trailing operation data is (1, 1, 1), it is necessary for the intermediate operation data corresponding to the port 3 to include five predetermined periods, i.e., the intermediate operation data needs to be (1, 1, 1, 1, 1), in order to achieve an 80% duty ratio. If this is the case, the total number of the cycles of the predetermined period included in the leading operation data, the intermediate operation data, and the trailing operation data is 11 (=3+5+3), and the total period is longer than the PWM period. In this case, the data for the port 3 corresponding to the respective predetermined periods is (0, 0, 0, 1, 1, 1, 1, 1, 1, 1, 1) (eleven data bits), and the data bit "1" corresponding to the last predetermined period is excessive. In this case, data corresponding to one predetermined period is excessive.

The logical disjunction calculation unit is configured to, upon the period determination unit determining that the sum total of the cycles of the predetermined period is longer than the PWM period, calculate, for each predetermined period, a logical disjunction of the trailing operation data and the leading operation data that correspond to an excessive period by which the sum total is longer in the order of the cycles of the predetermined period. The leading data generation unit is configured to generate data obtained by the logical disjunction calculation unit as the leading operation data. For example, with respect to the port 0, the data corresponding to the excessive predetermined period indicates "0", and the data corresponding to the first predetermined period out of the leading operation data indicates "1". Therefore, the logical disjunction of these is "1". Since the original leading operation data is "1, 1, 1", the data corresponding to the first predetermined period out of the leading operation data is not to be changed. In this case, the data for the port 0 corresponding to the predetermined periods in the PWM period is (1, 1, 1, 1, 1, 1, 1, 1, 0, 0), which corresponds to the case of an 80% duty ratio.

With respect to the port 3, the data corresponding to the excessive predetermined period indicates "1", and the data corresponding to the first predetermined period out of the leading operation data indicates "0". Therefore, the logical disjunction of these is "1". In this case, with respect to the port 3, the data corresponding to the first predetermined period out of the leading operation data is changed from "0" to "1", and thus the leading operation data is changed from (0, 0, 0) to (1, 0, 0). Therefore, the data for the port 3, corresponding to the predetermined periods in the PWM period, is changed to (1, 0, 0, 1, 1, 1, 1, 1, 1, 1), and thus correct operation data corresponding to the case of an 80% duty ratio can be generated.

One aspect of the present invention achieves multi-channel PWM control without using a timer port.

BRIEF DESCRIPTION OF DRAWINGS

FIG. 3 is a diagram illustrating an example of a set of operation data.

FIG. 5 is a diagram illustrating another example of a set of operation data.

FIG. 10A is a schematic diagram showing an example of an operation data generation method according to the first and the second embodiments.

FIG. 10B is a schematic diagram showing an example of the operation data generation method according to the first and the second embodiments.

FIG. 10C is a schematic diagram showing an example of the operation data generation method according to the first and the second embodiments.

FIG. 13 is a diagram illustrating an example of a set of PWM data generated in the PWM data generation buffer table and used for performing the PWM control shown in FIG. 12.

FIG. 14 is a diagram illustrating an example of a set of port driving data.

FIG. 16 is a diagram illustrating an example of a set of PWM data generated in the PWM data generation buffer table 52 and used for performing the PWM control shown in FIG. 15.

FIG. 17A is a diagram illustrating an example of a set of phase shift data.

FIG. 17B is a diagram illustrating an example of a set of inverted phase shift data.

FIG. 19 is a diagram illustrating an example of a set of PWM data generated in the PWM data generation buffer table 52 and used for performing the PWM control shown in FIG. 18.

FIG. 25 is a diagram illustrating an example of a set of PWM data generated in the PWM data generation buffer table 52 and used for performing the PWM control shown in FIG. 24.

FIG. 26 is a diagram illustrating an example of a set of PWM data generated by the microprocessor according to the third embodiment.

FIG. 27 is a diagram illustrating a set of port driving data used for generating the set of PWM data shown in FIG. 26.

FIG. 28A is a diagram illustrating a set of phase shift data used for generating the set of PWM data shown in FIG. 26.

FIG. 28B is a diagram illustrating a set of inverted phase shift data used for generating the set of PWM data shown in FIG. 26.

FIG. 29A is a schematic diagram showing an example of an operation data generation method according to the third embodiment.

FIG. 29B is a schematic diagram showing an example of the operation data generation method according to the third embodiment.

FIG. 30A is a schematic diagram showing an example of the operation data generation method according to the third embodiment.

FIG. 30B is a schematic diagram showing an example of the operation data generation method according to the third embodiment.

DETAILED DESCRIPTION OF THE PREFERRED EMBODIMENTS

First Embodiment

Figure 1:
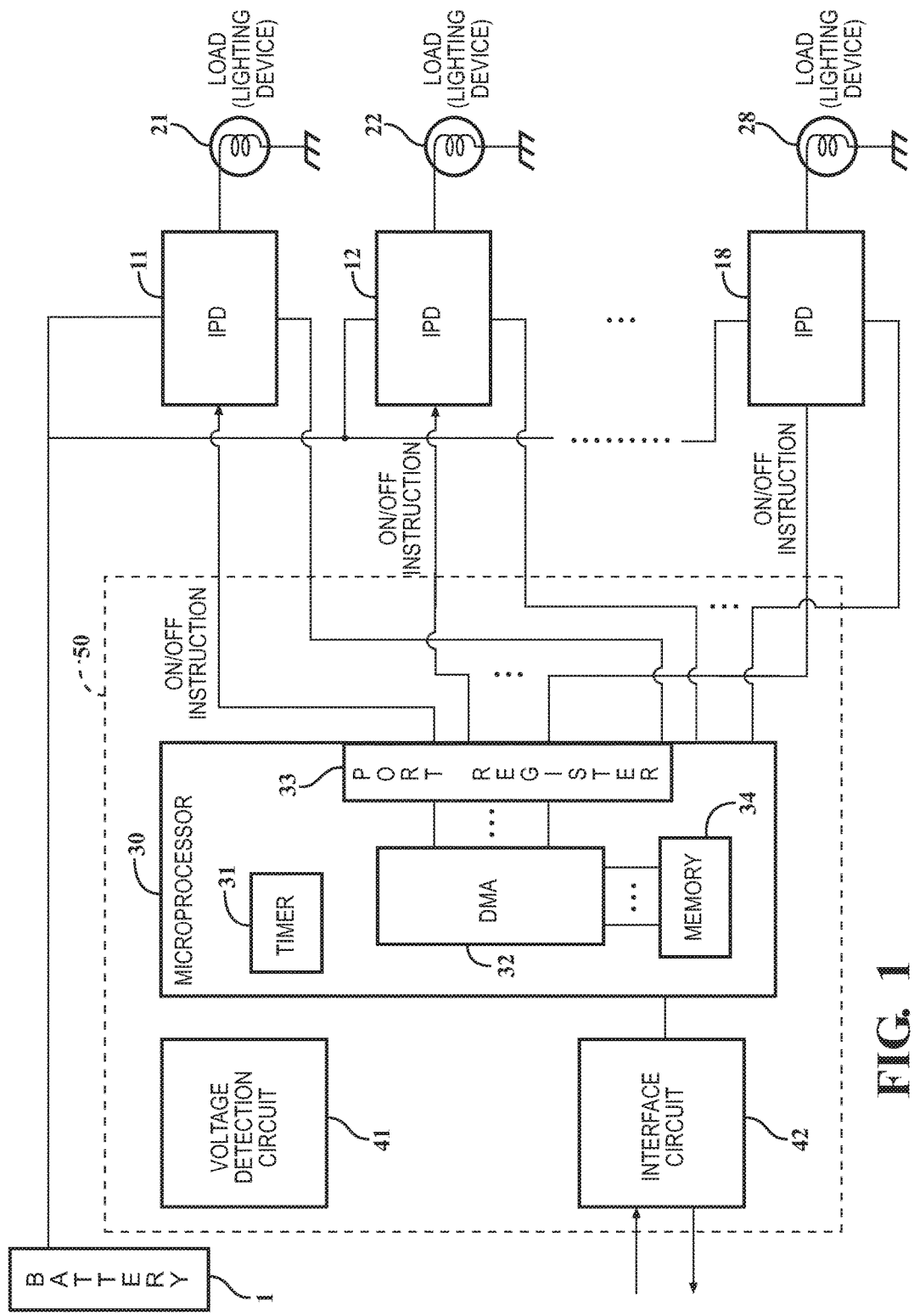
FIG. 1 is a block diagram showing an example of a configuration of a power source control device according to a first embodiment.

The following describes the present invention with reference to drawings that show embodiments of the invention. FIG. 1 is a block diagram showing an example of a configuration of a power source control device 50 according to a first embodiment. The following describes an on-board power source control device as an example of the power source control device 50. However, the power source control device 50 is not limited to an on-board power source control device. As shown in FIG. 1, the power source control device 50 includes a microprocessor (microcomputer) 30, a voltage detection circuit 41, and an interface circuit 42, for example. The microprocessor 30 includes a timer 31, a direct memory access (DMA) 32, a port register 33, and a memory 34, for example.

The port register 33 serves as an output unit. The port register 33 has, for example, eight ports, and eight intelligent power devices (IPDs) 11, 12, . . . , 18 are connected thereto. Each port of the port register 33 outputs an ON/OFF instruction (PWM signal) to the corresponding IPD. The eight IPDs 11 to 18 constitute a plurality of power source units.

A load (lighting device) 21, which is a lighting load, is connected to the IPD 11, a load (lighting device) 22, which is a lighting load, is connected to the IPD 12, and so on, up to a load (lighting device) 28, which is a lighting load, that is connected to the IPD 18. In other words, eight lighting loads are included in the example shown in FIG. 1. Note that the number of ports of the port register 33, the number of IPDs, and the number of loads are not limited to eight. Also, although the IPDs 11 to 18 in the example shown in FIG. 1 are configured separately from the power source control device 50, such a configuration is not necessary, and the IPDs 11 to 18 may be built into the power source control device 50.

Each of the IPDs 11 to 18 repeats an ON operation and an OFF operation in cycles having a predetermined PWM period (e.g. at a frequency of 100 Hz) based on an ON/OFF instruction (a PWM signal) output from the port register 33. Each of the IPDs 11 to 18 has the function of detecting current flowing to the corresponding load, and outputs information regarding the detected current, to the microprocessor 30. Thus, the microprocessor 30 serves as a current detection unit that detects the currents that the respective IPDs 11 to 18 supply to the corresponding load.

A battery 1 supplies a required amount of power to the IPDs 11 to 18. Note that in addition to lighting loads, power loads such as a motor and an air conditioner (not shown in the drawing) are connected to the battery 1. The voltage detection circuit 41 serves as a voltage detection unit, and detects the voltage applied to the IPDs 11 to 18, i.e., the voltage across the battery 1, and outputs the detected voltage to the microprocessor 30.

The interface circuit 42 serves as an acquisition unit, and acquires an instruction that specifies the duty ratio of the PWM control, from an external ECU (not shown in the drawing), for example. The interface circuit 42 also outputs status information of the power source control device 50, the IPDs 11 to 18, the loads 21 to 28, and so on to the external ECU or the like.

The microprocessor 30 serves as a generation unit, and generates operation data that correspond to the PWM period and that determine whether to cause the individual IPDs 11 to 18 to perform the ON operation or the OFF operation, in cycles of the timer interrupt period (predetermined period), which is shorter than the PWM period. The PWM period is the period of cycles in which the IPDs 11 to 18 repeat an ON operation and an OFF operation. The ratio of the ON operation time to the PWM period is the duty ratio of the PWM control. In the present embodiment, a timer interrupt period is described, which is taken as an example of the predetermined period.

Figure 2:
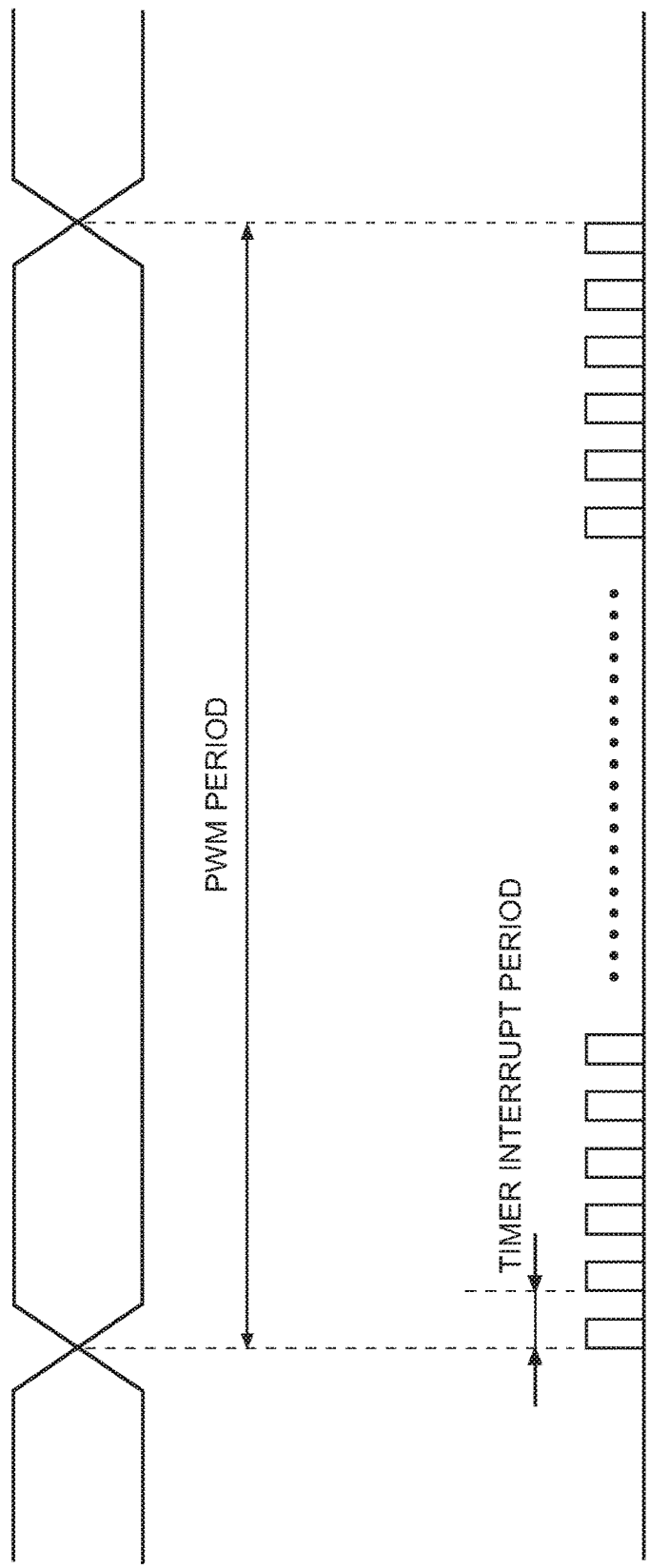
FIG. 2 is a diagram illustrating an example of a relationship between a PWM period and timer interrupt periods.

FIG. 2 is a diagram illustrating an example of a relationship between a PWM period and the cycles of the timer interrupt period (also referred to as "timer interrupt periods" in the following). As shown in FIG. 2, the timer interrupt period is a period obtained by dividing a PWM period by a required number (a number corresponding to the duty resolution, for example). If the PWM frequency is 100 Hz, one PWM period is 10 ms, and if the duty resolution is 1%, the PWM period is divided into one hundred sections, and therefore the timer interrupt period is 10 ms/100=100 µs.

An operation data set (also referred to as "table data set") is defined for each cycle of the timer interrupt period. If there is one operation data set for each cycle of the timer interrupt period, one hundred operation data sets are generated for the PWM period. Each set of operation data determines whether to cause the plurality of IPDs 11 to 18 to perform the ON operation or the OFF operation. Therefore, as shown in FIG. 1, for example, if there are eight IPDs, one operation data set may include eight operation data pieces or bits (e.g. information of eight bits) corresponding to the number of IPDs 11 to 18. In this case, there are eight hundred (8×100) operation data bits for one PWM period.

The microprocessor 30 stores the generated operation data in the memory 34 serving as a storage unit. The memory 34 may be a RAM, for example. Instead of the memory 34, a register serving as a storage unit may be used.

The timer 31 outputs an interrupt signal to the DMA 32 in synchronization with the above-described timer interrupt periods.

The DMA 32 serves as a transferring unit. Upon acquiring an interrupt signal output by the timer 31, the DMA 32 transfers operation data that corresponds to the timer interrupt period that is in synchronization with the interrupt signal, out of the operation data stored in the memory 34, to the port register 33. In this way, the timer 31 outputs an interrupt signal to the DMA 32 in synchronization with the timer interrupt period, and accordingly the DMA 32 transfers the operation data (one set of operation data) corresponding to the timer interrupt period from the memory 34 to the port register 33.

At cycles of the timer interrupt period, the port register 33 outputs an operation data set generated by the microprocessor 30 to the IPDs 11 to 18. In the above-described example, the port register 33 outputs one operation data set (data of eight bits corresponding to the eight IPDs 11 to 18) to the IPDs 11 to 18 every 100µ.

For example, the operation data of the 0$^{th}$ bit (also referred to as "port 0") is output to the 1$^{st}$ IPD 11, the operation data of the 1$^{st}$ bit (also referred to as "port 1") is output to the 2$^{nd}$ IPD 12, and so on, up to an operation data of the 7$^{th}$ bit (also referred to as "port 7") that is output to the 8$^{th}$ IPD 18. The operation data for each bit (each port) is binary data, namely "1" or "0". For example, "1" is the data that causes an IPD to perform the ON operation, and "0" is the data that causes an IPD to perform the OFF operation.

For a given one IPD (e.g. the IPD 11), the port register 33 outputs the operation data "1" or "0" to the IPD 11 at each timer interrupt period within the PWM period. The IPD 11 performs the ON operation while operation data bits "1" are successively output, and performs the OFF operation while operation data bits "0" are successively output. It is thus possible to perform PWM control on the IPD 11. The same applies to the other IPDs 12 to 18.

Figure 4:
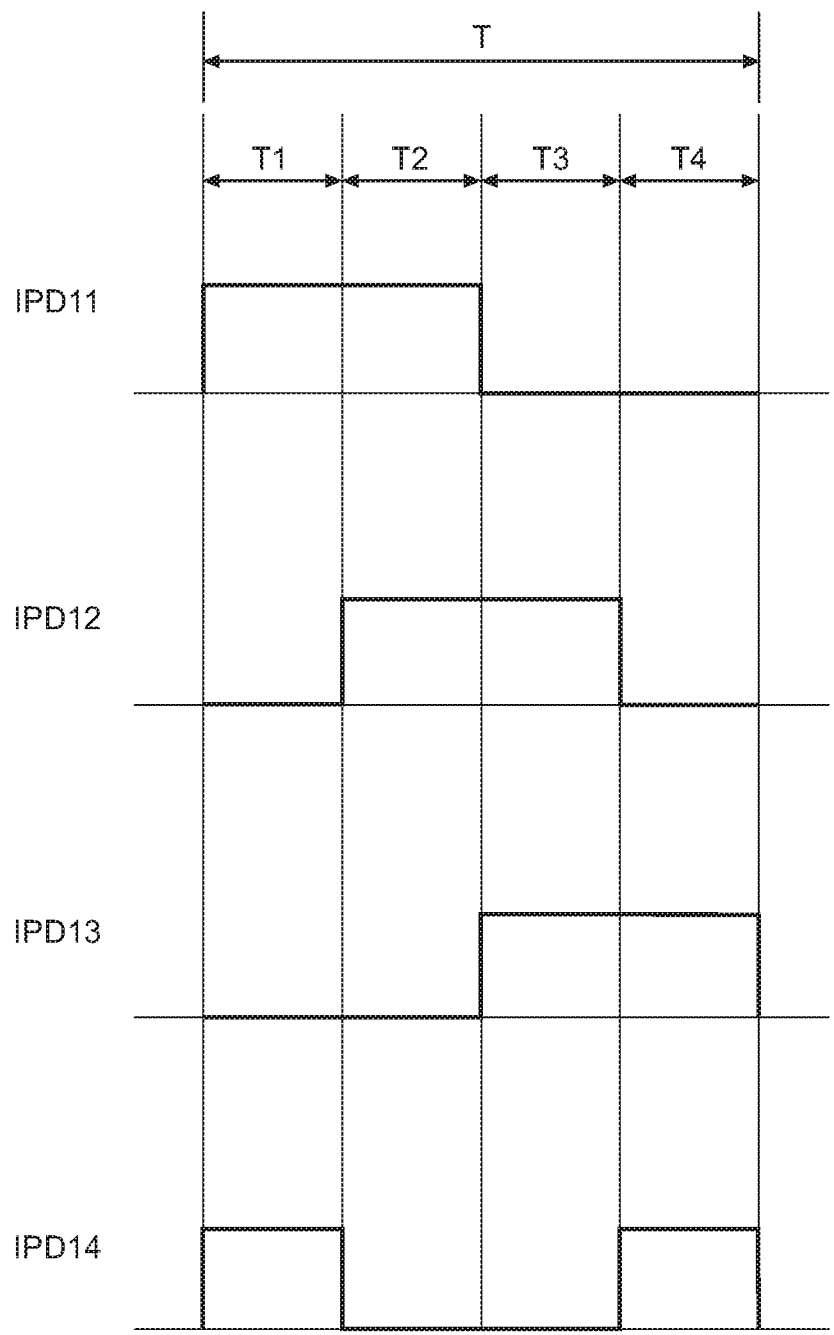
FIG. 4 is a diagram illustrating an example of PWM control based on the operation data shown in FIG. 3.

FIG. 3 is a diagram illustrating an example of operation data, and FIG. 4 is a diagram illustrating an example of PWM control based on the operation data shown in FIG. 3. In the examples shown in FIG. 3 and FIG. 4, it is assumed that one PWM period is composed of timer interrupt periods T1, T2, T3, and T4, for the sake of simplification. In other words, the PWM period is divided into four timer interrupt periods. It is also assumed that the port register 33 has four ports (output ports for four bits), and there are four IPDs. It is also assumed that the bit positions (port numbers) 0 to 3 of the port register 33 respectively correspond to the IPD 11 to the IPD 14.

As shown in FIG. 3, the operation data set for the timer interrupt period T1 is composed of "1", "0", "0", and "1" in order from the bit position 0 to the bit position 3. The operation data set for the timer interrupt period T2 is composed of "1", "1", "0", and "0" in order from the bit position 0 to the bit position 3. The operation data set for the timer interrupt period T3 is composed of "0", "1", "1", and "0" in order from the bit position 0 to the bit position 3. The operation data set for the timer interrupt period T4 is composed of "0", "0", "1", and "1" in order from the bit position 0 to the bit position 3.

If the operation data illustrated in FIG. 3 is observed regarding the IPD 11, for example, the operation data changes to "1", "1", "0", and "0" while the timer interrupt period transitions from T1 to T4. If it is assumed that the operation data bit "1" causes the IPD 11 to perform the ON operation and the operation data bit "0" causes the IPD 11 to perform the OFF operation, in the PWM control for the IPD 11, as shown in FIG. 4, the IPD 11 performs the ON operation during the timer interrupt periods T1 to T2, and the IPD 11 performs the OFF operation during the timer interrupt periods T3 to T4. Thus, PWM control with a 50% duty ratio can be performed. PWM control with a 50% duty ratio can be performed on the other IPDs 12 to 14 in the same manner.

With this configuration, it is possible to simultaneously perform PWM control on a plurality of IPDs, and it is possible to realize multi-channel PWM control without using a timer port.

The microprocessor 30 generates the operation data in such a manner that the ordinal numbers of the cycles of the timer interrupt period within the PWM period at which the plurality of IPDs 11 to 18 are respectively caused to perform the ON operation for the first time are different from each other. For example, as described above, if the PWM period is 100 Hz and the timer interrupt period is 100 µs, one PWM period is composed of one hundred timer interrupt periods. Here, it is assumed that the ordinal numbers of the cycles of the timer interrupt period are "1$^{st}$" to "100$^{th}$" in order from first to last. It is also assumed that the number of IPDs is eight. It is also assumed that the 1$^{st}$ IPD 11 is to be switched from OFF to ON at the 10$^{th}$ timer interrupt period, the 2$^{nd}$ IPD 12 is to be switched from OFF to ON at the 20$^{th}$ timer interrupt period, and so on, up to the 8$^{th}$ IPD 18, which is to be switched from OFF to ON at the 80$^{th}$ timer interrupt period. In such a case, the IPDs 11 to 18 are each switched from OFF to ON at a different time, and thus it is possible to realize phase shifting within a PWM period. With this configuration, it is possible to suppress inrush current and reduce noise (conduction noise or radiation noise) without using a timer port.

The following is a description based on the example shown in FIG. 4. In the example shown in FIG. 4, one PWM period is composed of four timer interrupt periods. It is assumed that the ordinal numbers of the cycles of the timer interrupt period are "T1", "T2", "T3", and "T4" in order from first to last. There are four IPDs, namely IPDs 11 to 14. The $1^{st}$ IPD 11 is switched from OFF to ON at the $1^{st}$ timer interrupt period T1. The $2^{nd}$ IPD 12 is switched from OFF to ON at the $2^{nd}$ timer interrupt period T2. The $3^{rd}$ IPD 13 is switched from OFF to ON at the $3^{rd}$ timer interrupt period T3. The $4^{th}$ IPD 14 is switched from OFF to ON at the last timer interrupt period T4. With this configuration, it is possible to realize phase shifting within a PWM period, and to suppress inrush current and reduce noise (conduction noise or radiation noise) without using a timer port.

The voltage detection circuit 41 detects the voltage applied to the plurality of IPDs 11 to 18. For example, as shown in FIG. 1, the voltage detection circuit 41 detects the voltage across the battery 1 that supplies power to the plurality of IPDs 11 to 18.

Depending on the voltage detected by the voltage detection circuit 41, the microprocessor 30 increases or reduces the number of timer interrupt periods within one PWM period at which the plurality of IPDs 11 to 18 are respectively caused to perform the ON operation. The following is a description based on an example.

Figure 6:
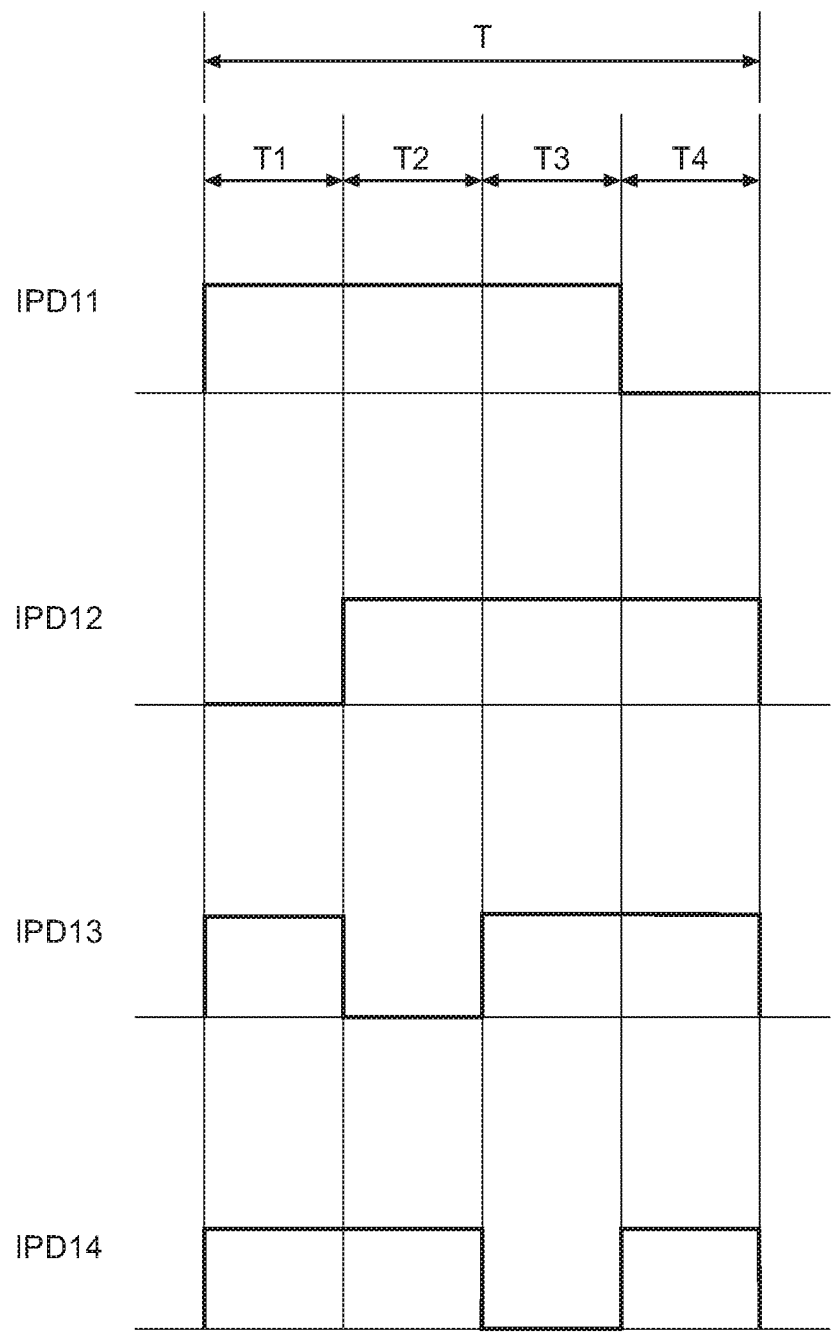
FIG. 6 is a diagram illustrating another example of PWM control based on the operation data shown in FIG. 5.

FIG. 5 is a diagram illustrating another example of operation data, and FIG. 6 is a diagram illustrating another example of PWM control based on the operation data shown in FIG. 5. As shown in FIG. 5, the operation data set for the timer interrupt period T1 is composed of "1", "0", "1", and "1" in order from the bit position 0 to the bit position 3. The operation data set for the timer interrupt period T2 is composed of "1", "1", "0", and "1" in order from the bit position 0 to the bit position 3. The operation data set for the timer interrupt period T3 is composed of "1", "1", "1", and "0" in order from the bit position 0 to the bit position 3. The operation data set for the timer interrupt period T4 is composed of "0", "1", "1", and "1" in order from the bit position 0 to the bit position 3.

If the operation data illustrated in FIG. 5 is observed regarding the IPD 11, for example, the operation data changes to "1", "1", "1", and "0" while the timer interrupt period transitions from T1 to T4. If it is assumed that the operation data bit "1" causes the IPD 11 to perform the ON operation and the operation data bit "0" causes the IPD 11 to perform the OFF operation, in the PWM control for the IPD 11, as shown in FIG. 5, the IPD 11 is caused to perform the ON operation during the timer interrupt periods T1 to T3, and the IPD 11 is caused to perform the OFF operation during the timer interrupt period T4. Thus, PWM control with a 75% duty ratio can be performed. PWM control with a 75% duty ratio can be performed on the other IPDs 12 to 14 in the same manner.

As described above, if the number of timer interrupt periods at which the IPDs are caused to perform the ON operation is increased within a PWM period, the IPDs perform the ON operation for a longer period, and the duty ratio can be increased. Also, if the number of timer interrupt periods during at which the IPDs are caused to perform the ON operation is reduced within a PWM period, the IPDs perform the ON operation for a shorter period, and the duty ratio can be reduced.

For example, when the power source voltage across the battery 1 or the like decreases depending on the status of the power loads, the number of timer interrupt periods at which the IPDs are caused to perform the ON operation within a PWM period is increased, and the duty ratio is thereby increased, in order to prevent the brightness of the lighting loads from decreasing. Consequently, it is possible to maintain the brightness of the lighting loads even when the power source voltage varies depending on the status of loads.

Figure 7:
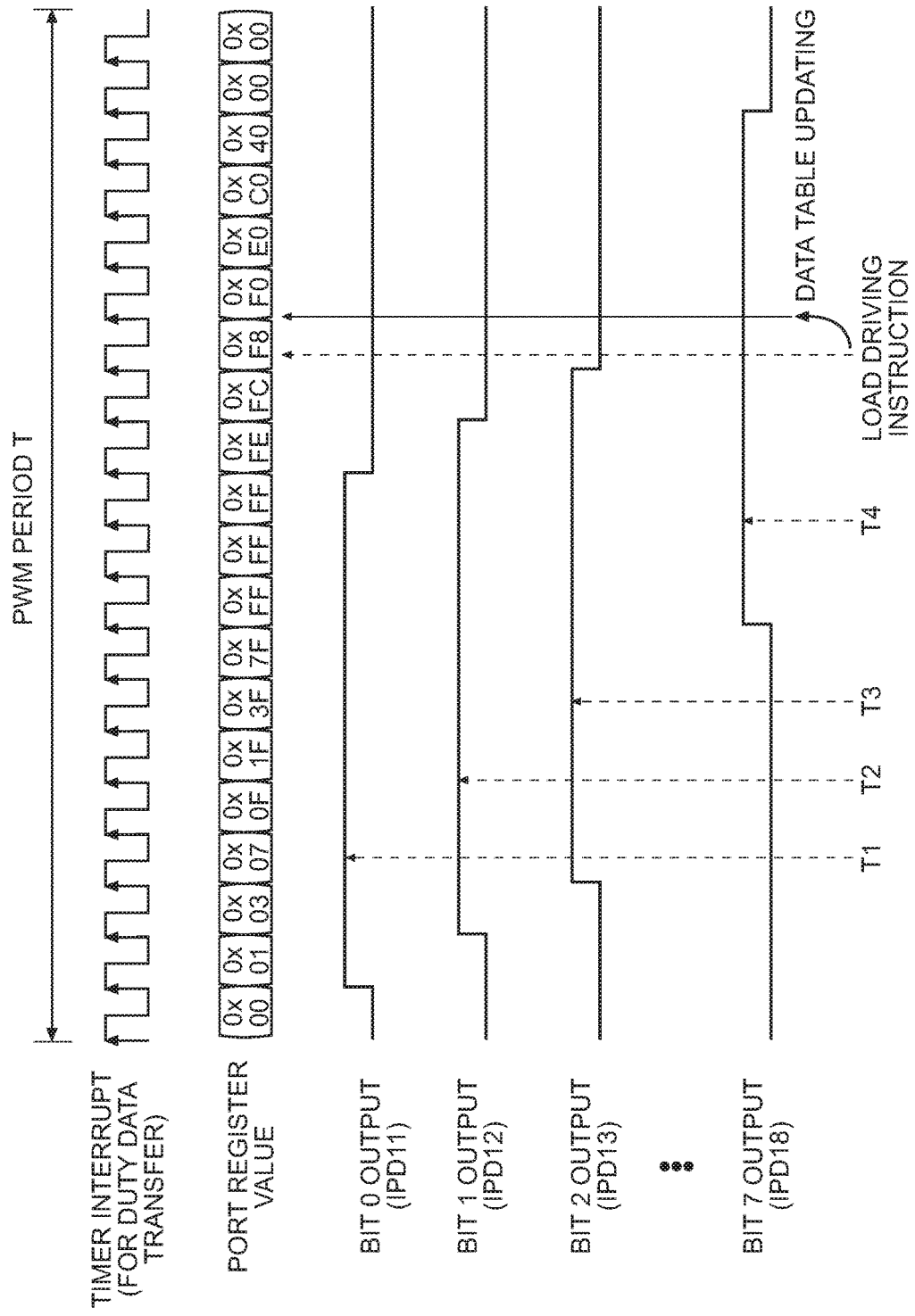
FIG. 7 is a time chart showing an example of the operation of the power source control device according to the first embodiment.

FIG. 7 is a time chart showing an example of an operation of the power source control device 50 according to the first embodiment. In FIG. 7, the chart in the upper tier shows timer interrupt periods. In the example shown in FIG. 7, a PWM period T is divided into twenty timer interrupt periods. The chart in the middle tier is the register value of the port register 33. The bits 0 to 7 (also referred to as ports 0 to 7) respectively correspond to the eight IPDs 11 to 18, and are defined by bit information of eight bits. The charts in the lower tiers are time charts showing ON or OFF of the IPDs 11 to 18.

For example, when the register value is 0x01, the bit corresponding to the bit 0 (IPD 11) is ON (i.e. the IPD is caused to perform the ON operation). Similarly, when the register value is 0x03, the bits corresponding to the bit 0 (IPD 11) and the bit 1 (IPD 12) are ON (i.e. the IPDs are caused to perform the ON operation). The same applies to the other register values.

The IPDs 11 to 18 serve as current detection units, and can detect the current supplied to their respective loads 21 to 28.

The microprocessor 30 serves as a control unit, and performs control so that each of the IPDs 11 to 18 detects current during the timer interrupt periods in which the IPD performs the ON operation based on the generated operation data.

For example, as shown in FIG. 7, the microprocessor 30 performs control to detect the current flowing to the load 21 at, for example, a point in time t1 within the period during which the IPD 11 is performing the ON operation. Similarly, the microprocessor 30 performs control to detect the current flowing to the load 22 at, for example, a point in time t2 within the period during which the IPD 12 is performing the ON operation. Also, the microprocessor 30 performs control to detect the current flowing to the load 23 at, for example, a point in time t3 within the period during which the IPD 13 is performing the ON operation. Also, the microprocessor 30 performs control to detect the current flowing to the load 28 at, for example, a point in time t8 within the period during which the IPD 18 is performing the ON operation. The same applies to the other IPDs.

The operation data generated by the microprocessor 30 is data that determines whether to let the individual IPDs 11 to 18 perform the ON operation or the OFF operation in the individual timer interrupt periods within the PWM period. Therefore, the microprocessor 30 can determine when the individual IPDs 11 to 18 perform the ON operation, by referring to the operation data generated by the microprocessor 30 itself. Thus, for each of the IPDs 11 to 18, it is possible to detect the current supplied to the corresponding load during the ON operation of the IPD. Therefore, additional circuits for detecting the ON timings of the IPDs 11 to 18 (the timings of the AD conversion for current detection) is unnecessary.

The interface circuit 42 acquires an instruction that specifies the duty ratio of PWM control (a load driving instruction) at a given timer interrupt period within the PWM period, from an external ECU, for example. The instruction that specifies the duty ratio (the load driving instruction) is, for example, an instruction to switch a lighting load from OFF to ON, an instruction to change the duty ratio while a lighting load is being ON, or the like.

The microprocessor 30 updates the operation data based on the instruction acquired by the interface circuit 42. For example, if the operation data is stored in the memory 34, the microprocessor 30 rewrites the operation data stored in the memory 34 with operation data based on the new instruction.

The port register 33 outputs the operation data, which has been updated by the microprocessor 30, at the timer interrupt period that is subsequent to a given timer interrupt period at which the load driving instruction has been acquired. Here, "the timer interrupt period that is later than a given timer interrupt period" may be, as shown in FIG. 7, the timer interrupt period that is subsequent to the given timer interrupt period, or the period that is later than the given timer interrupt period by two periods or three periods.

Consequently, the port register 33 can output the updated operation data without waiting until the subsequent PWM period. Therefore, for example, it is possible to turn ON a lighting device immediately after an instruction to turn ON the lighting device is received from an external ECU.

As described above, the power source control device 50 according to the present embodiment achieves multi-channel PWM control without using a timer port. If multi-channel phase shifting is performed in the case where a timer port is used in a conventional manner, complicated AD conversion timing control for current detection is required to enable the microcomputer (the CPU) to detect the period in which an IPD is ON. However, according to the present embodiment, the microprocessor 30 generates an operation table in advance. Therefore, it is easy to detect the ON/OFF timing of each IPD, and it is easy to perform current detection for abnormal state detection (fuse function) and AD conversion timing control. Also, it is possible to reduce electrical noise by performing phase shifting. Furthermore, it is possible to control the operations of the IPDs immediately after a load driving instruction is received from an external ECU or the like (with a delay time of approximately one timer interrupt period), without waiting until the subsequent PWM period.

In the above-described embodiment, a configuration is adopted in which when the PWM period is 100 Hz and the required duty ratio resolution is 1%, the timer interrupt period is set to 100 μs, and one hundred bits of operation data are prepared. However, these numeric values are merely examples, and the present invention is not limited to these numeric values. For example, the PWM period may be set to 200 Hz, and the PWM period may be divided into two sections, namely a PWM period 1 and a PWM period 2. When it is desired to output signals at a PWM period of 100 Hz with a 90% duty ratio (ON time of 9 ms) for example, it is possible to virtually output signals at a PWM period of 100 Hz with a 90% duty ratio (ON time of 9 ms) by outputting signals with a 100% duty ratio (ON time of 5 ms) during the PWM period 1 and outputting signals with an 80% duty ratio (ON time of 4 ms) during the PWM period 2. The operation data set may be rewritten between the PWM period 1 and the PWM period 2, and only 50 operation data sets are required, instead of one hundred operation data sets. Thus, it is possible to reduce the memory capacity.

Second Embodiment

Figure 8:
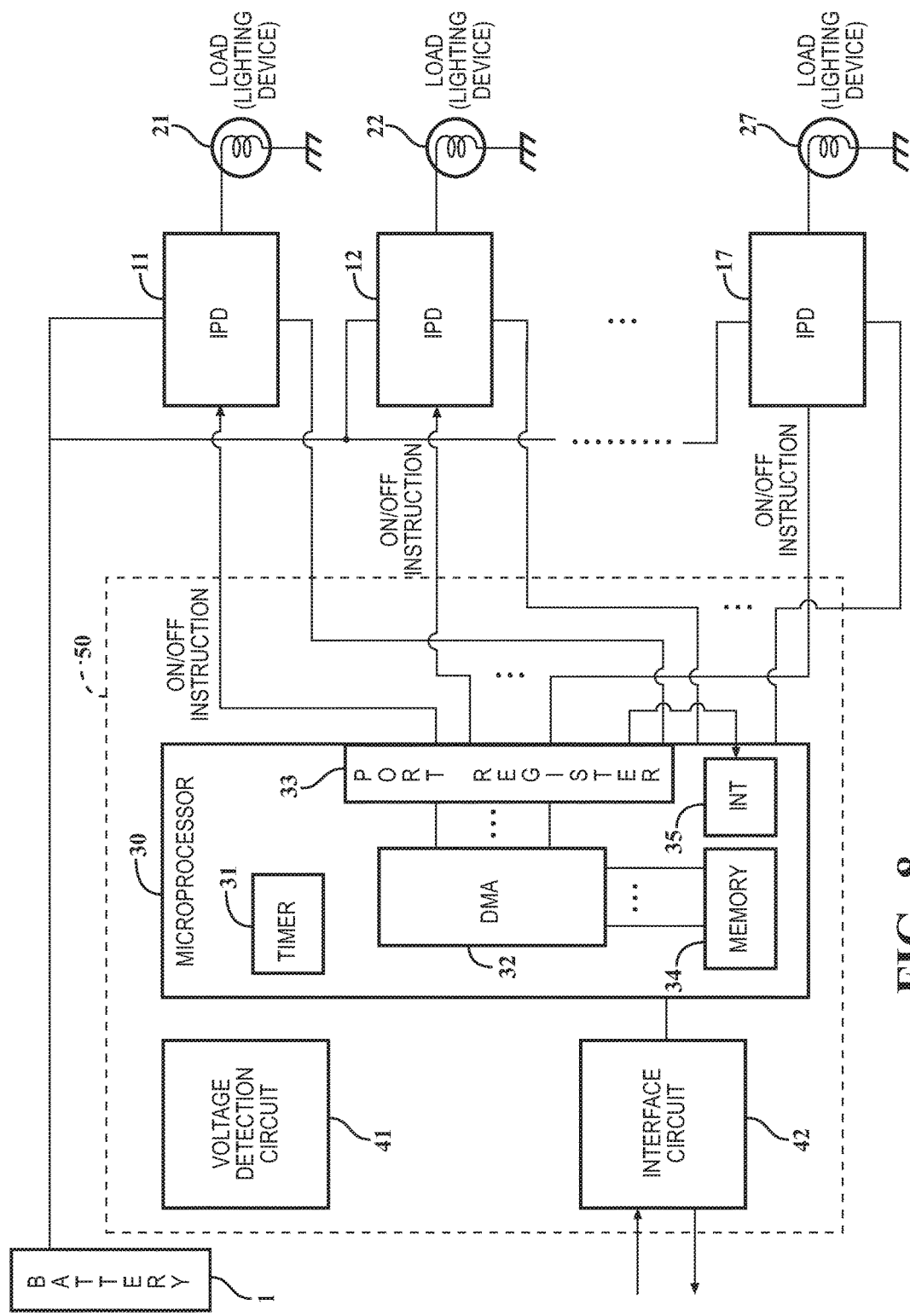
FIG. 8 is a block diagram showing an example of a configuration of a power source control device according to a second embodiment.
Figure 9:
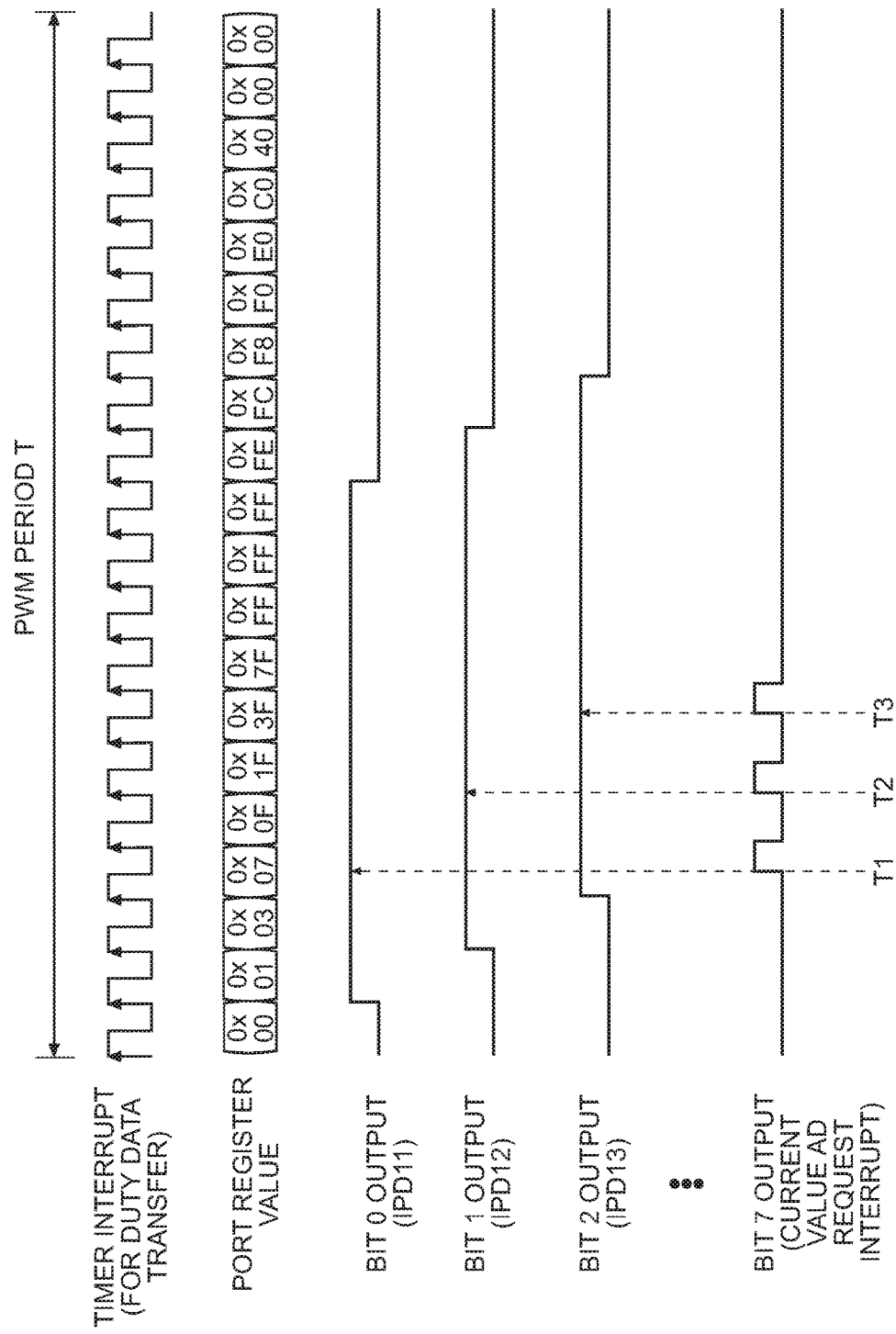
FIG. 9 is a time chart showing an example of an operation of the power source control device according to the second embodiment.

FIG. 8 is a block diagram showing an example of a configuration of a power source control device 50 according to a second embodiment, and FIG. 9 is a time chart showing an example of an operation of the power source control device 50 according to the second embodiment. In the above-described first embodiment, a configuration is adopted in which the microprocessor 30 detects the currents flowing from the IPDs to the loads at the points in time t1, t2, and so on as shown in FIG. 7 for example, by using a current value reading timing generation timer inside the microprocessor 30. The current value reading timing does not necessarily have to be detected by using a timer. In the second embodiment, one port (e.g. the port 7) out of the ports used for outputting ON/OFF instructions to the IPDs is used for outputting current value reading timing information.

As shown in FIG. 8 and FIG. 9, ON/OFF instructions to the IPDs 11 to 17 are output by using seven ports, namely the ports 0 to 6, of the port register 33. The port 7 outputs a current value AD request interrupt to an INT 35. The INT 35 is, for example, an interrupt port in the microprocessor 30. This configuration makes it possible to read a current value at given points in time t1, t2, t3, and so on, and makes the current value reading timing generation timer unnecessary.

Figure 10B:
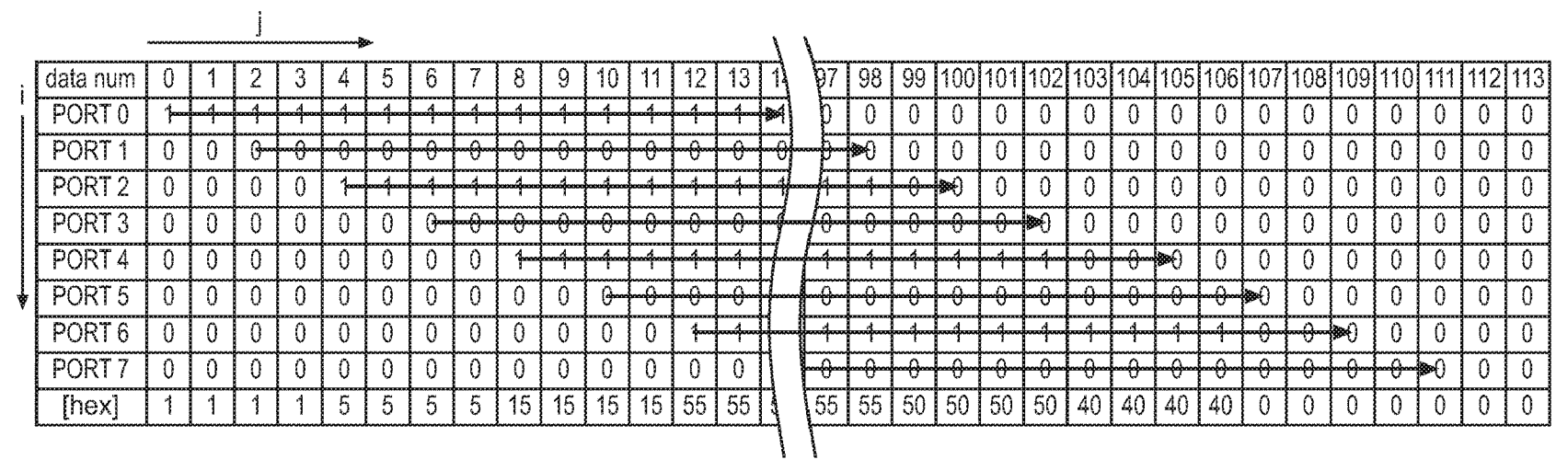

Next, an operation data generation method according to the first embodiment and the second embodiment is described. FIGS. 10A, 10B, and 10C are schematic diagrams showing an example of the operation data generation method according to the first embodiment and the second embodiment. In the following description, the operation data set is also referred to as "PWM data". FIG. 10A shows a configuration of a PWM data generation buffer table. The PWM data generation buffer table contains a given number of entries, the given number corresponding to the number of ports of the port register 33 (in the example shown in FIGS. 10A to 10C, eight ports, namely the port 0 to the port 7). The PWM data generation buffer table can hold a given number of data for each port, the given number being equal to the total (114) of: the number indicating the duty resolution (in the example shown in FIGS. 10A to 10C, one hundred data bits having the data numbers ([datanum]) 0 to 99); and the number of data bits in a phase shift excessive (or overflow) portion (in the example shown in FIGS. 10A to 10C, fourteen data bits having the data numbers ([datanum]) 100 to 113). In other words, the PWM data generation buffer table can hold 800 (8×100) data bits as the PWM data (operation data) corresponding to the PWM period, and 112 (8×14) data bits in the phase shift excessive portion. Note that the number of ports and the duty resolution number are merely examples and are not limited to those shown in FIGS. 10A to 10C.

When PWM data is generated, first, as shown in FIG. 10A, the PWM data generation buffer table is cleared (all the data is set to 0).

Next, as shown in FIG. 10B, PWM data is written for each port. In this case, it is assumed that the duty ratio is 95%, a phase shift amount between ports is 2%, and the ports to be driven are the ports 0, 2, 4, and 6. The phase shift amount between ports indicates the phase shift amount between adjacent ports. When the phase shift amount between ports is 2%, this corresponds to a shift of twice the duty resolution (1%) is shifted by 2 between adjacent ports. As shown in FIG. 10B, first, the port 0 is selected, and ninety-five data bits "1" are written into the $0^{th}$ positions to the $94^{th}$ positions, and data bits "0" are written into the $95^{th}$ positions to the $99^{th}$ positions. In this case, a writing process (loop) is repeated one hundred times. Next, the port 1 is selected, and one hundred data bits "0" are written into the $2^{nd}$ to the $101^{st}$ positions, considering the phase shift amount between ports. In this case as well, a writing process (loop) is repeated one hundred times. Thereafter, in the same manner, the writing process is repeated for each of the ports 2 to 7. In this case, a writing process is repeated eight hundred times. As shown in FIG. 10B, since the data is written with consideration of the phase shift amount between ports, the data for the ports 3 to 7 overflows into the phase shift excessive portion.

Next, as shown in FIG. 10C, the data resulting from an OR operation performed on: the data that has overflown into the phase shift excessive portion (at the $100^{th}$ positions to the $113^{th}$ positions); and the top data (from the $0^{th}$ position to the $13^{th}$ position), out of the data written with consideration of the phase shift amount between ports, are written into the top portion (from the $0^{th}$ position to the $13^{th}$ position).

Finally, out of the data generated in the PWM data generation buffer table, the PWM data (the $0^{th}$ to the $99^{th}$ data bits) other than the data in the phase shift excessive portion are stored in the memory 34. The PWM data (the operation data) are thus stored in the memory 34.

Third Embodiment

Figure 11:
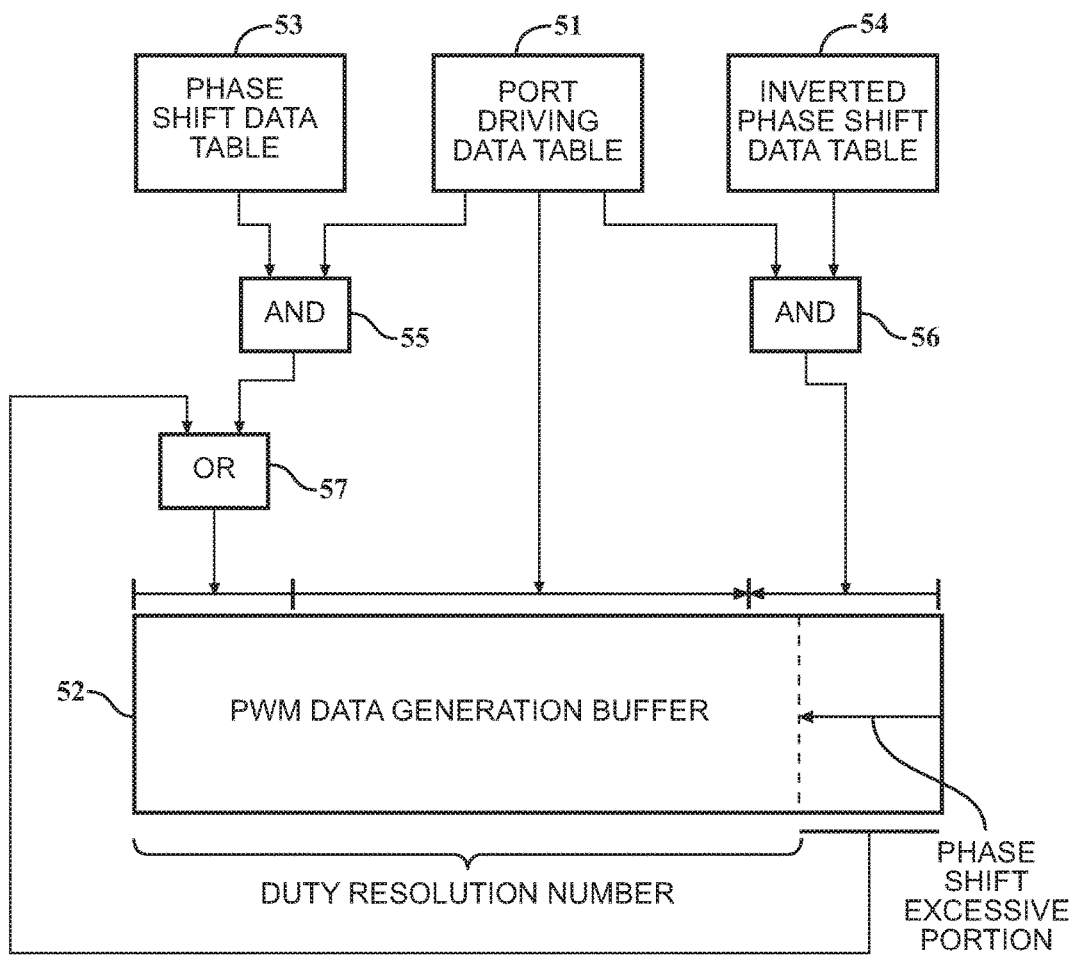
FIG. 11 is a block diagram showing an example of the configuration of the microprocessor according to the third embodiment.

The PWM data generation method is not limited to the example shown in FIGS. 10A to 10C. The following describes a PWM data generation method that is even more efficient. FIG. 11 is a block diagram showing an example of a configuration of a microprocessor 30 according to the third embodiment. As shown in FIG. 11, the microprocessor 30 includes a port driving data table 51, a PWM data generation buffer table 52, a phase shift data table 53, an inverted phase shift data table 54, AND circuits (logical conjunction calculation units) 55 and 56, and an OR circuit (logical disjunction calculation unit) 57, for example. The microprocessor 30 serves as a writing unit and a period determination unit, which are described below.

The PWM data generation buffer table 52 contains a given number of entries, the given number corresponding to the number of ports of the port register 33. The PWM data generation buffer table 52 can hold a given number of data bits for each port, the given number being equal to the total of: the number indicating the duty resolution; and the number of data bits in the phase shift excessive portion.

The port driving data table 51 stores port driving data, which is described below. The phase shift data table 53 stores phase shift data, which is described below. The inverted phase shift data table 54 stores inverted phase shift data, which is described below.

The outline of the PWM data generation method is as follows. First, the microprocessor 30 organizes (arranges) the port driving data stored in the port driving data table 51 into a set of data for each cycle of the timer interrupt period (predetermined period), and writes a given number of sets of port driving data into the PWM data generation buffer table 52, the given number corresponding to the duty resolution multiple (the number of timer interrupt periods) corresponding to the duty ratio. In this case, a leading portion of the PWM data generation buffer table 52 is left unoccupied, because phase shift data is to be written to the leading portion.

Next, the microprocessor 30 organizes the data resulting from an AND operation performed by the AND circuit 55 on: the port driving data; and the inverted phase shift data stored in the inverted phase shift data table 54, into a set of data for each cycle of the timer interrupt period (predetermined period), and writes the sets of data into a trailing portion of the PWM data generation buffer table 52. In this case, the data resulting from the AND operation performed by the AND circuit 55 is written into the trailing side of the portion in which the port driving data has been written.

Next, the microprocessor 30 organizes the data resulting from an OR operation performed by the OR circuit 57 on: data resulting from an AND operation performed by the AND circuit 56 on the port driving data and the phase shift data stored in the phase shift data table 53; and the data in the phase shift excessive portion of the PWM data generation buffer table 52, into a set of data for each cycle of the timer interrupt period (predetermined period), and writes the sets of data into the leading portion of the PWM data generation buffer table 52.

Finally, out of the data generated in the PWM data generation buffer table 52, the PWM data excluding the data in the phase shift excessive portion are stored in the memory 34. The PWM data (the operation data) are thus stored in the memory 34.

As described above, the microprocessor 30 writes one set of PWM data (operation data) all at once for each cycle of the timer interrupt period (predetermined period) into the PWM data generation buffer table 52 by performing one loop (repeating process). For example, if the duty resolution is 1% and the number of ports is eight, information of eight bits can be written in one loop, and the loop needs to be performed approximately one hundred times in order to write all the operation data. Consequently, it is possible to reduce the processing time required for generating the PWM data and to reduce the processing workload (the load relating to the processing), compared to the case in which, as shown in FIGS. 10A to 10C, approximately eight hundred data bits are sequentially written into the buffer and the loop is repeated approximately eight hundred times.

Next, a specific description is given of PWM data generation. In the following example, it is assumed that the number of ports is four, the duty resolution is 10%, and the phase shift amount between ports is 10%, for the sake of simplification. In other words, ten timer interrupt periods are included in the PWM period.

Figure 12:
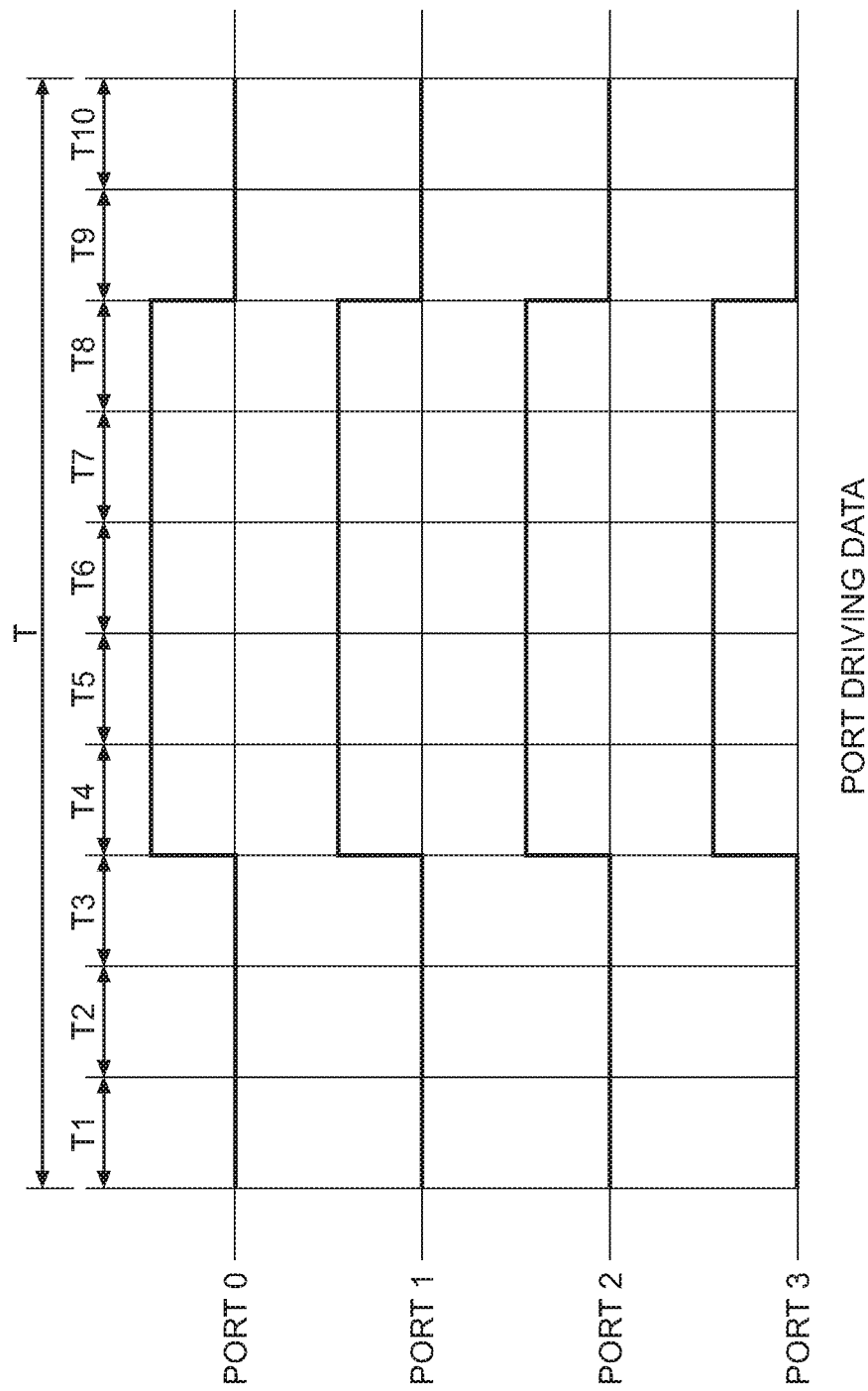
FIG. 12 is a diagram illustrating an example of PWM control performed in a case where a duty ratio is 50% and phase shifting is not performed.

First, a specific description is given of PWM data generation in the case where phase shifting is not performed. FIG. 12 is a diagram illustrating an example of PWM control performed in the case where the duty ratio is 50% and the phase shifting is not performed, and FIG. 13 is a diagram illustrating an example of a set of PWM data generated in the PWM data generation buffer table 52 and used for performing the PWM control shown in FIG. 12. As shown in FIG. 12 and FIG. 13, the timer interrupt periods included in the PWM period are denoted as T1, T2, . . . , and T10, in order from first to last. Note that the PWM data generation buffer table 52 has been cleared in advance.

FIG. 14 is a diagram illustrating an example of a set of port driving data. The driving data indicates whether or not to operate the corresponding IPD, i.e., whether or not to drive the corresponding IPD, and "1" drives the IPD, and "0" does not drive the IPD (keeps the IPD stopped). The driving data for all of the ports 0 to 3 is set to 1, for the sake of simplification. However, the driving data is not limited to the example shown in FIG. 14.

As shown in FIG. 12, if the IPDs are caused to perform the ON operation during the timer interrupt periods T4 to T8, and are caused to perform the OFF operation during the remaining timer interrupt periods (T1 to T3, T9, and T10), the microprocessor 30 writes the port driving data shown in FIG. 14 all at once to the positions corresponding to the timer interrupt period T4 in the PWM data generation buffer table 52. After completing the writing to the positions corresponding to the timer interrupt period T4, the microprocessor 30 writes the port driving data all at once to the positions corresponding to the timer interrupt period T5 in the PWM data generation buffer table 52. Thereafter, in the same manner, the writing process is repeated for the positions corresponding to the timer interrupt period T8 in the PWM data generation buffer table 52. In this way, the PWM data set for performing PWM control shown in FIG. 12 can be generated.

As described above, the microprocessor 30 organizes (arranges) one set of PWM data (operation data) for each cycle of the timer interrupt period (predetermined period), and writes a set of PWM data into the buffer table 52 for PWM data generation in one loop (repeating process). Consequently, it is possible to reduce the processing time required for generating the PWM data and to reduce the processing workload (the load relating to the processing), compared to the case in which data is sequentially written into the buffer one bit at a time.

Next, a specific description is given of PWM data generation in the case where phase shifting is performed. When phase shifting is performed, phase shift data and inverted phase shift data described below are used. The port driving data set to be used is the data set shown in FIG. 14.

Figure 15:
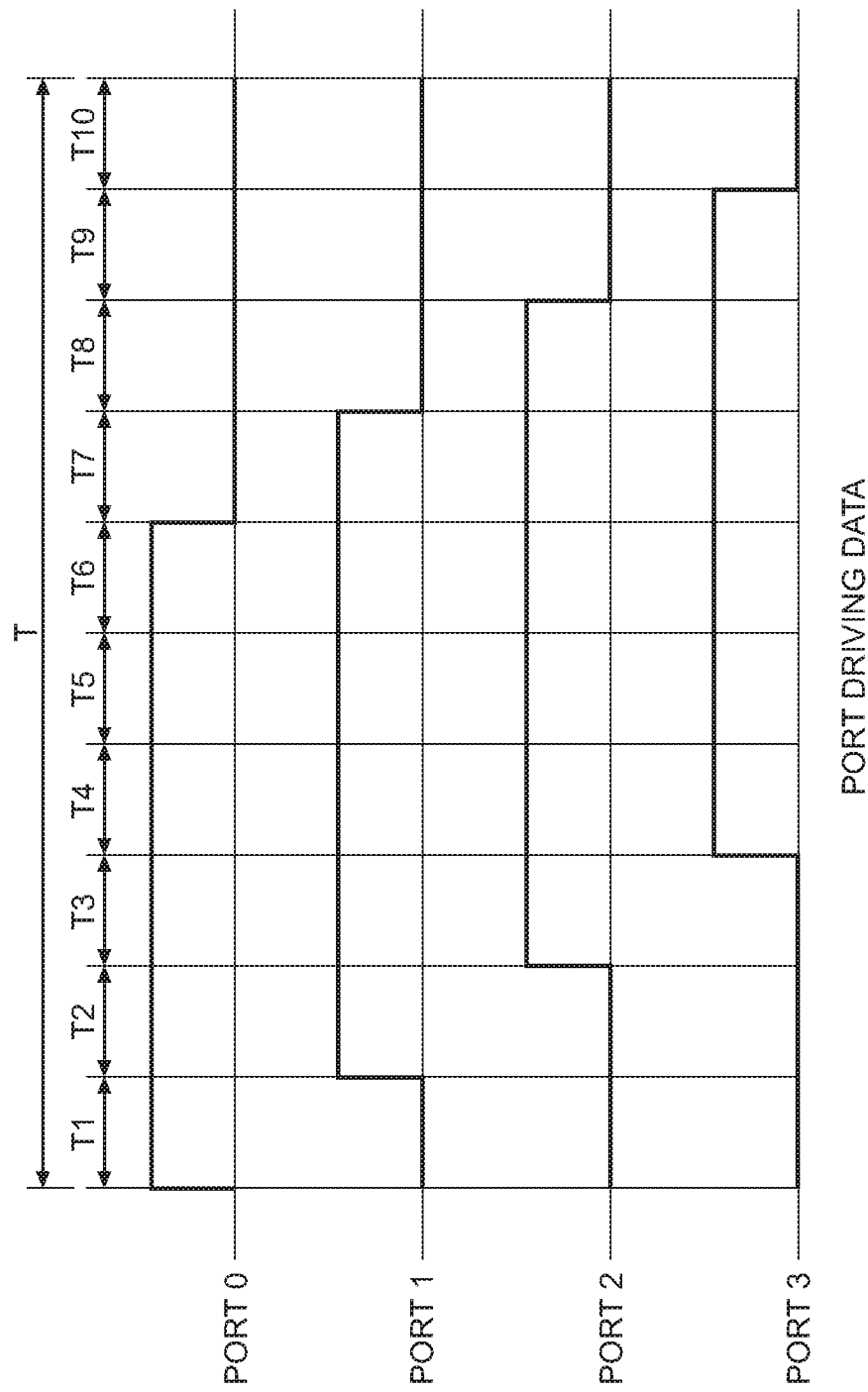
FIG. 15 is a diagram illustrating an example of PWM control performed in a case where the duty ratio is 60% and phase shifting is performed.

FIG. 15 is a diagram illustrating an example of PWM control performed in the case where the duty ratio is 60% and phase shifting is performed, and FIG. 16 is a diagram illustrating an example of PWM data generated in the PWM data generation buffer table 52 and used for performing PWM control shown in FIG. 15. Note that the PWM data generation buffer table 52 has been cleared in advance.

FIG. 17A is a diagram illustrating an example of phase shift data, and FIG. 17B is a diagram illustrating an example of inverted phase shift data. The phase shift data (also referred to as "leading operation data") is data for causing a plurality of IPDs to perform the initial ON operation one after another at the timer interrupt periods in the leading portion of the PWM period. Here, "leading portion" is, for example, a period from the first timer interrupt period to a given timer interrupt period in the PWM period.

For example, it is assumed that there are four IPDs, and the ports of the output unit that drive the IPDs are "port 0", "port 1", "port 2", and "port 3". The data that causes an IPD to perform the ON operation is "1", and the data that causes an IPD to perform the OFF operation is "0". It is assumed that the ordinal numbers of the cycles of the timer interrupt period of the phase shift data are "0", "1", "2", and so on in order from first to last. As shown in FIG. 17A, the phase shift data for the port 0 is "1", "1", and "1" in order of the timer interrupt periods. The phase shift data for the port 1 is "0", "1", and "1" in order of the timer interrupt periods. The phase shift data for the port 2 is "0", "0", and "1" in order of the timer interrupt periods. The phase shift data for the port 3 is"0", "0", and "0" in order of the timer interrupt periods.

In other words, the phase shift data is operation data that causes the IPDs to perform the ON operation one after another at each timer interrupt period. That is, the phase shift data is data for shifting the timing (the timer interrupt period) at which each IPD starts the ON operation in PWM control. Note that the phase shift data does not include a set of data that causes all the IPDs to perform the ON operation at a given timer interrupt period.

The inverted phase shift data (also referred to as "trailing operation data") is data for causing a plurality of IPDs to perform the initial OFF operation one after another at each of the timer interrupt periods in the trailing portion of the PWM period. Here, "trailing portion" is, for example, a period from a given timer interrupt period to the last timer interrupt period in the PWM period.

For example, it is assumed that there are four IPDs, and the ports of the output unit that drive the IPDs are referred to as "port 0", "port 1", "port 2", and "port 3". The data that causes an IPD to perform the ON operation is "1", and the data that causes an IPD to perform the OFF operation is "0". It is assumed that the ordinal numbers of the cycles of the timer interrupt period of the inverted phase shift data are "0", "1", "2", and so on in order from first to last. As shown in FIG. 17B, the inverted phase shift data for the port 0 is "0", "0", and "0" in order of the timer interrupt periods. The phase shift data for the port 1 is "1", "0", and "0" in order of the timer interrupt periods. The phase shift data for the port 2 is "1", "1", and "0" in order of the timer interrupt periods. The phase shift data for the port 3 is "1", "1", and "1" in order of the timer interrupt periods.

In other words, the inverted phase shift data is operation data that causes the IPDs to perform the OFF operation one after another at each timer interrupt period. That is, the inverted phase shift data is data for shifting the timing at which the individual IPDs start the OFF operation (the timer interrupt period) in PWM control. Note that the inverted phase shift data does not include a set of data that causes all the IPDs to perform the ON operation at a given timer interrupt period.

Note that the inverted phase shift data is configured by inverting all "1"s of the phase shift data to "0"s and inverting all "0"s of the phase shift data to "1"s. In the example shown in FIG. 11, the inverted phase shift data table 54 is provided, and the inverted phase shift data is stored in the inverted phase shift data table 54. However, the present invention is not limited to such a configuration. For example, it is also possible that an inversion circuit is provided and the inverted phase shift data is generated by inverting the phase shift data using the inversion circuit.

As shown in FIG. 15, it is assumed that the IPD corresponding to the port 0 is caused to perform the ON operation during the timer interrupt periods T1 to T6, and the IPD is caused to perform the OFF operation during the timer interrupt periods T7 to T10. It is also assumed that the IPD corresponding to the port 1 is caused to perform the ON operation during the timer interrupt periods T2 to T7, and the IPD is caused to perform the OFF operation during the timer interrupt periods T1 and T8 to T10. It is also assumed that the IPD corresponding to the port 2 is caused to perform the ON operation during the timer interrupt periods T3 to T8, and the IPD is caused to perform the OFF operation during the timer interrupt periods T1 to T2 and T9 to T10. It is also assumed that the IPD corresponding to the port 3 is caused to perform the ON operation during the timer interrupt periods T4 to T9, and the IPD is caused to perform the OFF operation during the timer interrupt periods T1 to T3 and T10.

As shown in FIG. 16, the PWM data generation buffer table 52 can be divided into a leading phase shift portion 521, which corresponds to the timer interrupt periods T1 to T3, a no-phase-shift portion 522, which corresponds to the timer interrupt periods T4 to T6, and a trailing phase shift portion 523, which corresponds to the timer interrupt periods T7 to T9. The leading phase shift portion 521 is a region into which the phase shift data is to be written, the no-phase-shift portion 522 is a region into which the port driving data is to be written, and the trailing phase shift portion 523 is the region into which the inverted phase shift data is to be written.

That is, the microprocessor 30 writes the port driving data shown in FIG. 14 all at once to the positions corresponding to the timer interrupt period T4 in the PWM data generation buffer table 52. After completing the writing to the positions corresponding to the timer interrupt period T4, the microprocessor 30 writes the port driving data all at once to the positions corresponding to the timer interrupt period T5 in the PWM data generation buffer table 52. Thereafter, in the same manner, the writing process is repeated to the positions corresponding to the timer interrupt period T6 in the PWM data generation buffer table 52.

In other words, the microprocessor 30 serves as an intermediate data generation unit, and generates intermediate operation data for causing the plurality of IPDs to perform the ON operation for each timer interrupt period during the intermediate portion between the leading portion and the trailing portion of the PWM data generation buffer table 52 (during the timer interrupt periods T4 to T6 in the example shown in FIG. 16). The intermediate portion is composed of the remaining timer interrupt periods besides the leading portion and the trailing portion in the PWM period (the non-phase-shift portion shown in FIG. 16).

That is, the intermediate operation data is operation data that causes the IPDs to perform the ON operation throughout the timer interrupt periods. Note that the duty ratio is the ratio of the total of the timer interrupt periods at which the leading operation data, the intermediate operation data, and the trailing operation data indicate "1" for a given port, to the PWM period.

Next, the microprocessor 30 organizes the inverted phase shift data shown in FIG. 17B into a set of data for each cycle of the timer interrupt period, and writes the sets of data to the positions corresponding to the timer interrupt periods T7 to T9 in the PWM data generation buffer table 52.

In other words, the microprocessor 30 serves as a trailing data generation unit, and generates trailing operation data for causing the plurality of IPDs to perform the initial OFF operation one after another at respective timer interrupt periods in the trailing portion of the PWM period.

Next, the microprocessor 30 organizes the phase shift data shown in FIG. 17A into a set of data for each cycle of the timer interrupt period, and writes the sets of data to the positions corresponding to the timer interrupt periods T1 to T3 in the PWM data generation buffer table 52.

In other words, the microprocessor 30 serves as a leading data generation unit, and generates leading operation data for causing the plurality of IPDs to perform the initial ON operation one after another at each cycles of the timer interrupt period in the leading portion of the PWM period.

The microprocessor 30 organizes the PWM data in the leading phase shift portion 521 (the leading operation data), the PWM data in the no-phase-shift portion 522 (the intermediate operation data), and the PWM data in the trailing phase shift portion 523 (the trailing operation data) into a set of data for all cycles of the timer interrupt period, and sequentially writes the sets of data into the PWM data generation buffer table 52. Consequently, the PWM data for each cycle of the timer interrupt period can be written by performing one loop, and it is possible to reduce the processing time required for generating the PWM data and to reduce the processing workload (the load relating to the processing), compared to the case in which the PWM data is sequentially written into the buffer one at a time (one bit at a time) and the loop is repeated.

Figure 18:
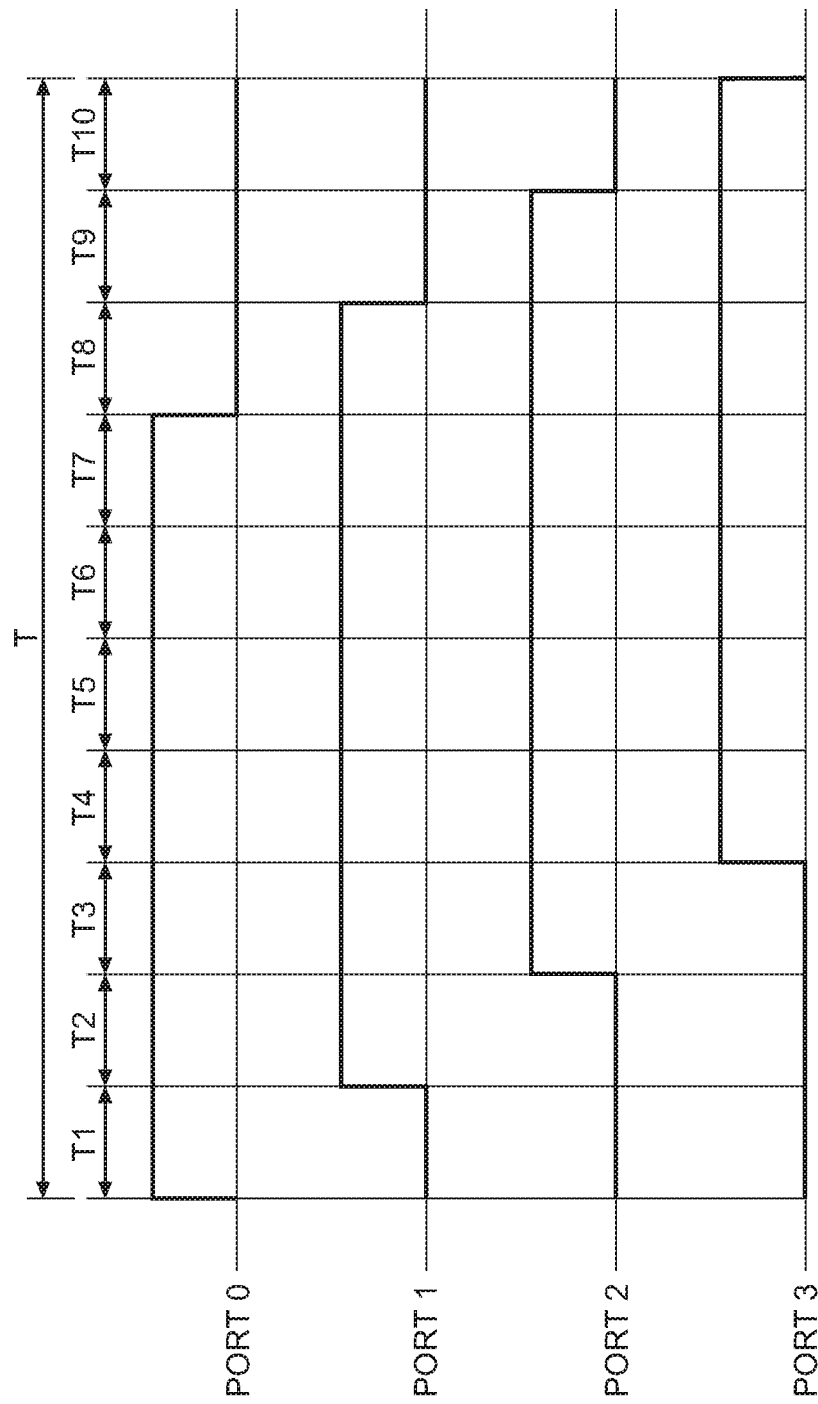
FIG. 18 is a diagram illustrating an example of PWM control performed in a case where the duty ratio is 70% and phase shifting is performed.

FIG. 18 is a diagram illustrating an example of PWM control performed in the case where the duty ratio is 70% and phase shifting is performed, and FIG. 19 is a diagram illustrating an example of PWM data generated in the PWM data generation buffer table 52 and used for performing PWM control shown in FIG. 18. Note that the PWM data generation buffer table 52 has been cleared in advance. The port driving data to be used is the data shown in FIG. 14. The phase shift data and the inverted phase shift data to be used are the data shown in FIGS. 17A and 17B.

As shown in FIG. 18, it is assumed that the IPD corresponding to the port 0 is caused to perform the ON operation during the timer interrupt periods T1 to T7, and the IPD is caused to perform the OFF operation during the timer interrupt periods T8 to T10. It is also assumed that the IPD corresponding to the port 1 is caused to perform the ON operation during the timer interrupt periods T2 to T8, and the IPD is caused to perform the OFF operation during the timer interrupt periods T1 and T9 to T10. It is also assumed that the IPD corresponding to the port 2 is caused to perform the ON operation during the timer interrupt periods T3 to T9, and the IPD is caused to perform the OFF operation during the timer interrupt periods T1 to T2 and T10. It is also assumed that the IPD corresponding to the port 3 is caused to perform the ON operation during the timer interrupt periods T4 to T10, and the IPD is caused to perform the OFF operation during the timer interrupt periods T1 to T3.

As shown in FIG. 19, the PWM data generation buffer table 52 can be divided into a leading phase shift portion 521, which corresponds to the timer interrupt periods T1 to T3, a no-phase-shift portion 522, which corresponds to the timer interrupt periods T4 to T7, and a trailing phase shift portion 523, which corresponds to the timer interrupt periods T8 to T10. The leading phase shift portion 521 is a region into which the phase shift data is to be written, the no-phase-shift portion 522 is a region into which the port driving data is to be written, and the trailing phase shift portion 523 is the region into which the inverted phase shift data is to be written.

That is, the microprocessor 30 writes the port driving data shown in FIG. 14 all at once to the positions corresponding to the timer interrupt period T4 in the PWM data generation buffer table 52. After completing the writing to the positions corresponding to the timer interrupt period T4, the microprocessor 30 writes the port driving data all at once to the positions corresponding to the timer interrupt period T5 in the PWM data generation buffer table 52. Thereafter, in the same manner, the writing process is repeated up to the positions corresponding to the timer interrupt period T7 in the PWM data generation buffer table 52.

As described above, the microprocessor 30 controls the number of timer interrupt periods to be included in the PWM data (the intermediate operation data) in the no-phase-shift portion 522 according to the duty ratio of PWM control. As described above, when the duty ratio is 60% three timer interrupt periods are included in the no-phase-shift portion 522 of the PWM data set (FIG. 16), whereas when the duty ratio is 70% four timer interrupt periods are included in the no-phase-shift portion 522 of the PWM data set (FIG. 19). In this way, it is possible to cause the IPDs to operate with a desired duty ratio by increasing or decreasing the number of times a set of operation data corresponding to each timer interrupt period is written.

Consequently, as with the case shown in FIG. 16, the PWM data for each cycle of the timer interrupt period can be written by performing one loop, and it is possible to reduce the processing time required for generating the PWM data and to reduce the processing workload (the load relating to the processing), compared to the case in which the PWM data are sequentially written into the buffer one at a time (one bit at a time) and the loop is repeated.

Next, an example is described in which the phase shift excessive portion of the PWM data generation buffer table 52 is used when the duty ratio is high.

Figure 20:
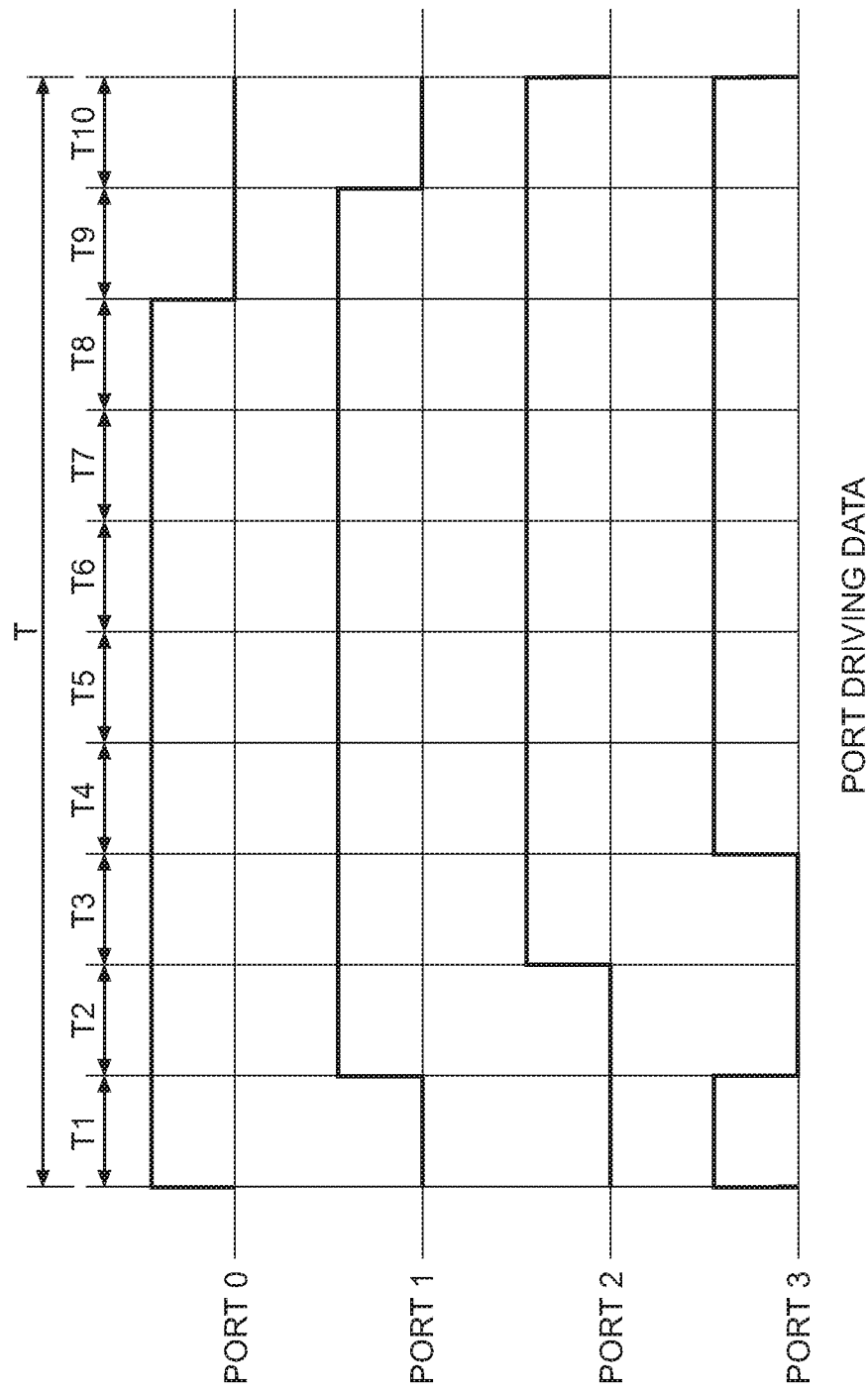
FIG. 20 is a diagram illustrating an example of PWM control performed in a case where the duty ratio is 80% and phase shifting is performed.
Figure 21:
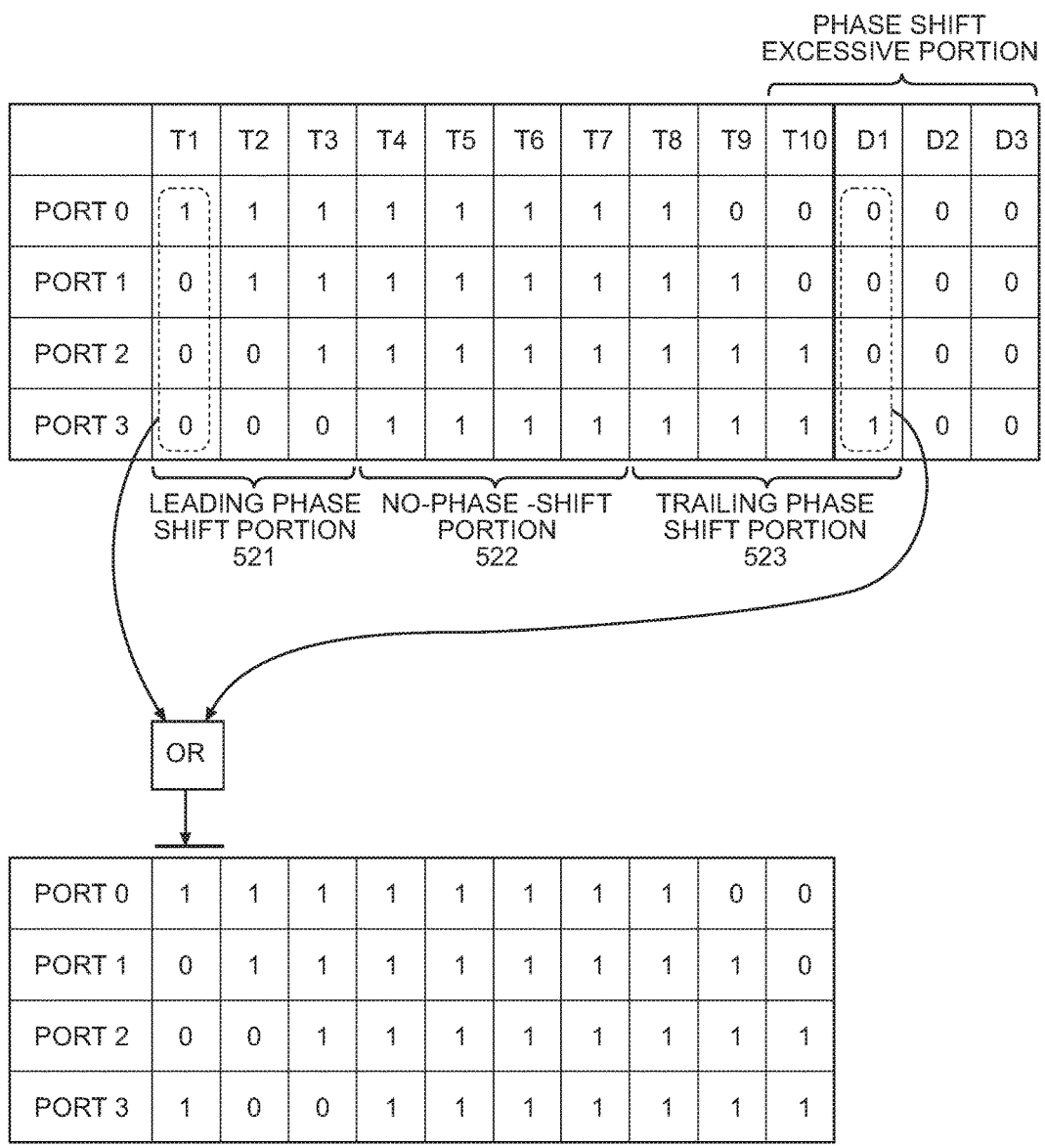
FIG. 21 is a diagram illustrating an example of a set of PWM data generated in the PWM data generation buffer table 52 and used for performing the PWM control shown in FIG. 20.

FIG. 20 is a diagram illustrating an example of PWM control performed in the case where the duty ratio is 80% and the phase shifting is performed, and FIG. 21 is a diagram illustrating an example of PWM data generated in the PWM data generation buffer table 52 and used for performing PWM control shown in FIG. 20. The PWM data generation buffer table 52 holds data at the positions indicated by the timer interrupt periods D1, D2, and D3, which serve as the phase shift excessive portion. Note that the PWM data generation buffer table 52 has been cleared in advance. The port driving data to be used is the data shown in FIG. 14. The phase shift data and the inverted phase shift data to be used are the data shown in FIGS. 17A and 17B.

As shown in FIG. 20, it is assumed that the IPD corresponding to the port 0 is caused to perform the ON operation during the timer interrupt periods T1 to T8, and the IPD is caused to perform the OFF operation during the timer interrupt periods T9 to T10. It is also assumed that the IPD corresponding to the port 1 is caused to perform the ON operation during the timer interrupt periods T2 to T9, and the IPD is caused to perform the OFF operation during the timer interrupt periods T1 and T10. It is also assumed that the IPD corresponding to the port 2 is caused to perform the ON operation during the timer interrupt periods T3 to T10, and the IPD is caused to perform the OFF operation during the timer interrupt periods T1 to T2. It is also assumed that the IPD corresponding to the port 3 is caused to perform the ON operation during the timer interrupt periods T1 and T4 to T10, and the IPD is caused to perform the OFF operation during the timer interrupt periods T2 to T3.

In this case, as shown in FIG. 21, the PWM data generation buffer table 52 can be divided into the leading phase shift portion 521, which corresponds to the timer interrupt periods T1 to T3, the no-phase-shift portion 522, which corresponds to the timer interrupt periods T4 to T8, and the trailing phase shift portion 523, which corresponds to the timer interrupt periods T9 to T10 and the timer interrupt period D1 of the phase shift excessive portion.

That is, the microprocessor 30 writes the port driving data shown in FIG. 14 all at once to the positions corresponding to the timer interrupt period T4 in the PWM data generation buffer table 52. Thereafter, in the same manner, the writing process is repeated to the positions corresponding to the timer interrupt period T8 in the PWM data generation buffer table 52.

The microprocessor 30 serves as the period determination unit, and determines whether or not the total of the timer interrupt periods included in the PWM data in the leading phase shift portion 521 (the leading operation data), the PWM data in the no-phase-shift portion 522 (the intermediate operation data), and the PWM data in the trailing phase shift portion 523 (the trailing operation data) is longer than the PMW period.

For example, it is assumed that the ports of the output unit are "port 0", "port 1", "port 2", and "port 3", and the duty resolution number is ten. The duty resolution number is the number of timer interrupt periods included in the PWM period. When the duty resolution number is ten, one PWM period includes ten timer interrupt periods. The ten timer interrupt periods are denoted as T1, T2, . . . , and T10, in order from first to last. Since there are four ports, the leading phase shift portion 521 and the trailing phase shift portion 523 each include three timer interrupt periods.

When the duty ratio is 80%, with respect to a given port, the number of timer interrupt periods at which the data indicates "1" within the PWM period is eight. With respect to the port 0 for example, if the PWM data in the leading phase shift portion 521 is (1, 1, 1) and the PWM data in the trailing phase shift portion 523 is (0, 0, 0) as shown in FIG. 21, it is necessary for the no-phase-shift portion 522 corresponding to the port 0 to include five timer interrupt periods, i.e., the PWM data therein needs to be (1, 1, 1, 1, 1), in order to achieve an 80% duty ratio. If this is the case, the total number of the cycles of the timer interrupt period included in the PWM data in the leading phase shift portion 521, the PWM data in the no-phase-shift portion 522, and the PWM data in the trailing phase shift portion 523 is 11 (=3+5+3), and the total period is longer than the PWM period. In this case, the data for the port 0 corresponding to the respective timer interrupt periods is (1, 1, 1, 1, 1, 1, 1, 1, 0, 0, 0) (eleven data bits), and the data bit "0" corresponding to the last timer interrupt period D1 is excessive. In this case, data corresponding to one timer interrupt period is excessive.

When phase shifting for each port is considered, with respect to the port 3 for example, if the PWM data in the leading phase shift portion 521 are (0, 0, 0) and the PWM data in the trailing phase shift portion 523 is (1, 1, 1), it is necessary for the no-phase-shift portion 522 corresponding to the port 3 to include five timer interrupt periods, i.e., the PWM data therein needs to be (1, 1, 1, 1, 1), in order to achieve an 80% duty ratio. If this is the case, the total number of the cycles of the timer interrupt period included in the PWM data in the leading phase shift portion 521, the PWM data in the no-phase-shift portion 522, and the PWM data in the trailing phase shift portion 523 is 11 (=3+5+3), and the total period is longer than the PWM period. In this case, the data for the port 3 corresponding to the respective timer interrupt periods is (0, 0, 0, 1, 1, 1, 1, 1, 1, 1, 1) (eleven data bits), and the last data bit "1" corresponding to the timer interrupt period D1 is excessive. In this case, data corresponding to one timer interrupt period is excessive.

Upon determining that the total period is longer than the PWM period, the microprocessor 30 successively calculates the logical disjunction of; the data corresponding to the excessive period out of the PWM data in the trailing phase shift portion 523; and the PWM data corresponding to the timer interrupt periods in the leading phase shift portion 521, in the order of the timer interrupt periods, using the OR circuit 17. Then, the microprocessor 30 generates the data obtained by the OR circuit 57 as the PWM data in the leading phase shift portion 521.

As shown in FIG. 21, with respect to the port 0 for example, the data corresponding to the excessive timer interrupt period (D1) is "0", and the data corresponding to the first timer interrupt period (T1) in the leading phase shift portion 521 is "1". Therefore, the logical disjunction of these is "1". Since the original PWM data in the leading phase shift portion 521 is "1, 1, 1", the data corresponding to the first timer interrupt period (T1) in the leading phase shift portion 521 is not to be changed. In this case, the data for the port 0 corresponding to the timer interrupt periods in the PWM period is (1, 1, 1, 1, 1, 1, 1, 1, 0, 0) in order from T1 to T10, which corresponds to the case of an 80% duty ratio. The cases of the ports 1 and 2 are similar as the case of the port 0.

In contrast, with respect to the port 3, the data corresponding to the excessive timer interrupt period (D1) is"1", and the data corresponding to the first timer interrupt period (T1) in the leading phase shift portion 521 is "0". Therefore, the logical disjunction of these is "1". In this case, the data for the port 3 corresponding to the first timer interrupt period in the leading phase shift portion 521 is changed from "0" to "1", and the PWM data in the leading phase shift portion 521 is changed from (0, 0, 0) to (1, 0, 0). Therefore, the data for the port 3 corresponding to the timer interrupt periods in the PWM period is changed to (1, 0, 0, 1, 1, 1, 1, 1, 1, 1) in order from T1 to T10, and thus correct PWM data (operation data) corresponding to the case of an 80% duty ratio can be generated.

Figure 22:
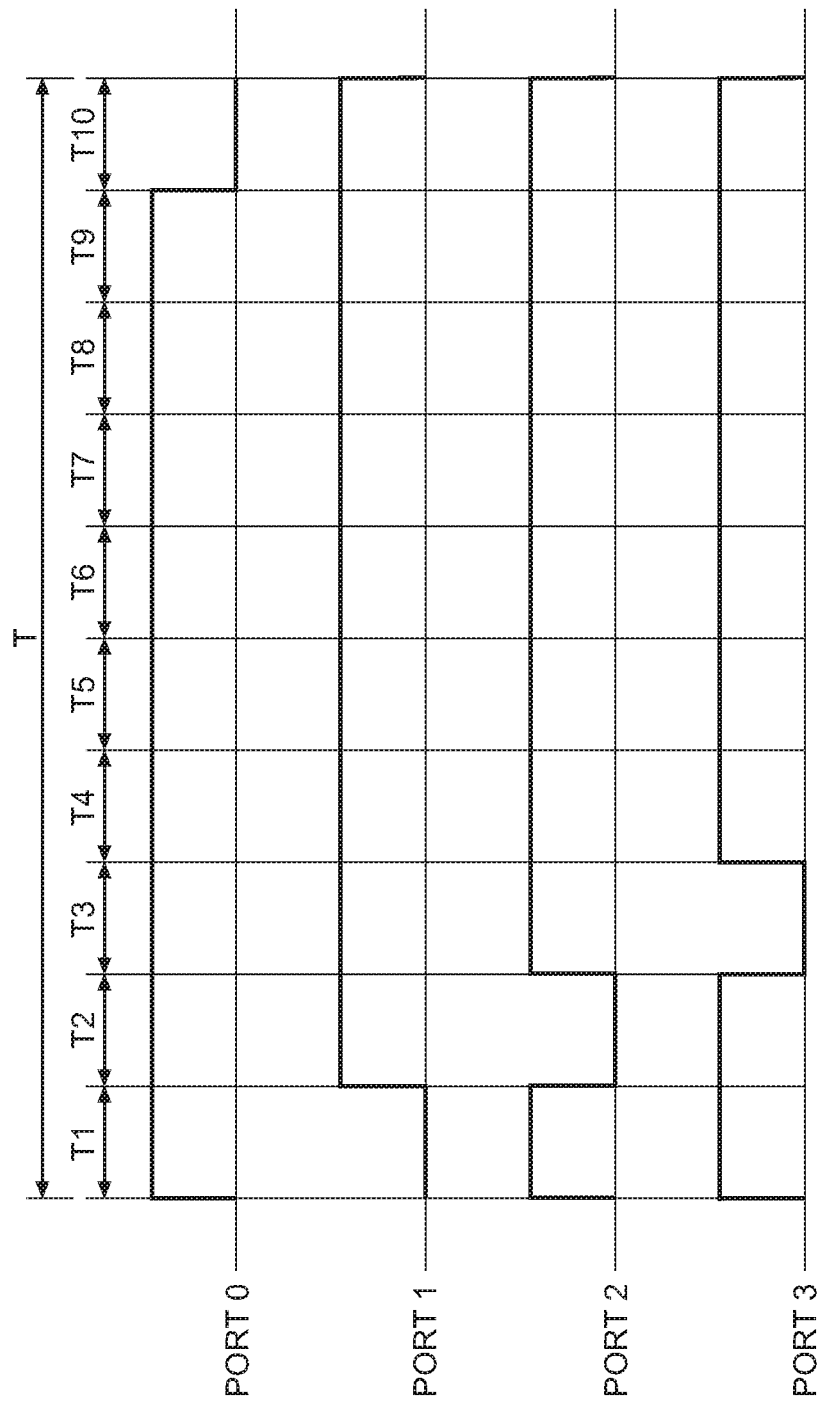
FIG. 22 is a diagram illustrating an example of PWM control performed in a case where the duty ratio is 90% and phase shifting is performed.
Figure 23:
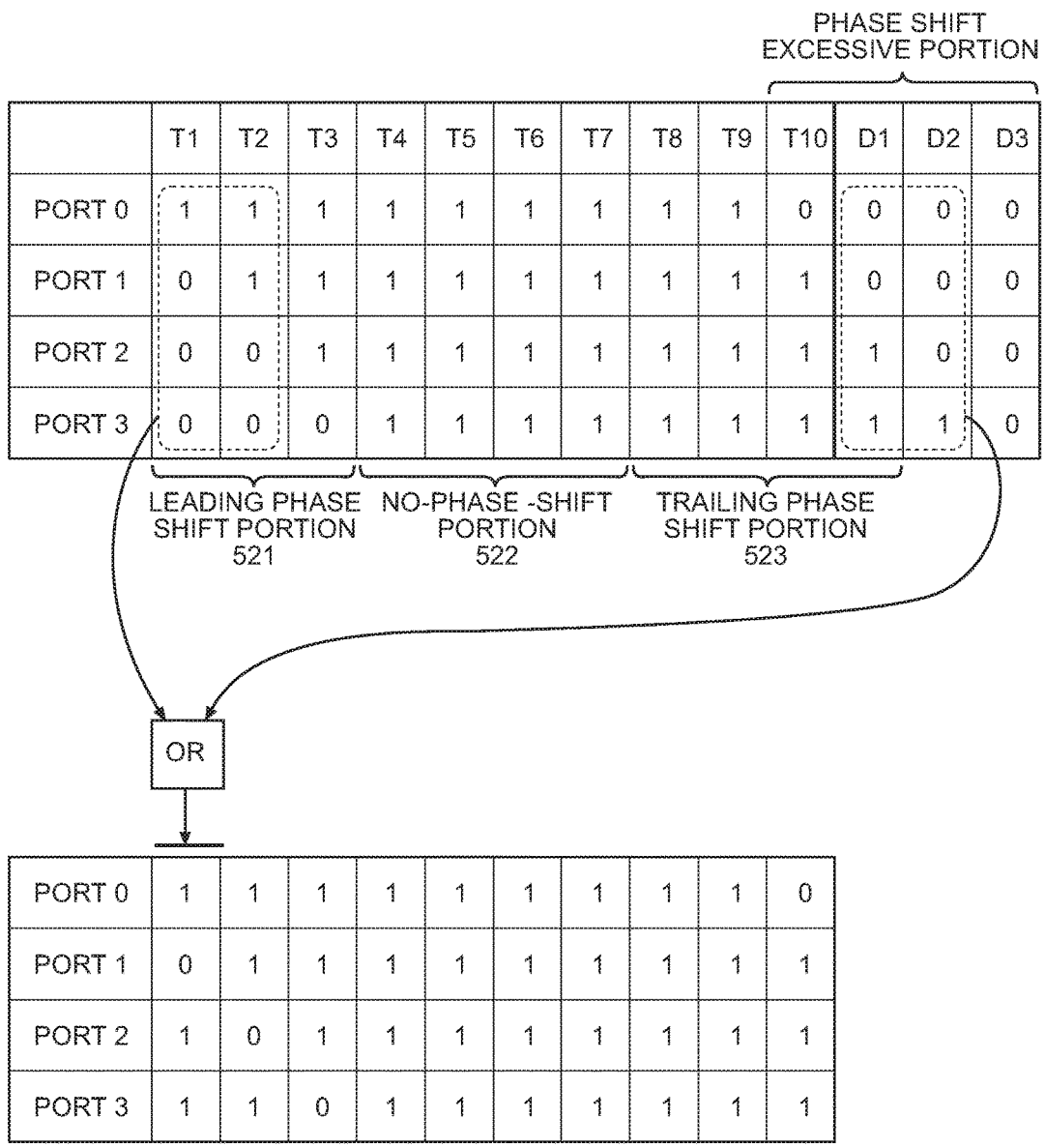
FIG. 23 is a diagram illustrating an example of a set of PWM data generated in the PWM data generation buffer table 52 and used for performing the PWM control shown in FIG. 22.

FIG. 22 is a diagram illustrating an example of PWM control performed in the case where the duty ratio is 90% and the phase shifting is performed, and FIG. 23 is a diagram illustrating an example of PWM data generated in the PWM data generation buffer table 52 and used for performing PWM control shown in FIG. 22. Note that the PWM data generation buffer table 52 has been cleared in advance. The port driving data to be used is the data shown in FIG. 14. The phase shift data and the inverted phase shift data to be used is the data shown in FIGS. 17A and 17B.

As shown in FIG. 22, it is assumed that the IPD corresponding to the port 0 is caused to perform the ON operation during the timer interrupt periods T1 to T9, and the IPD is caused to perform the OFF operation during the timer interrupt period T10. It is also assumed that the IPD corresponding to the port 1 is caused to perform the ON operation during the timer interrupt periods T2 to T10, and the IPD is caused to perform the OFF operation during the timer interrupt period T1. It is also assumed that the IPD corresponding to the port 2 is caused to perform the ON operation during the timer interrupt periods T3 to T10 and T1, and the IPD is caused to perform the OFF operation during the timer interrupt period T2. It is also assumed that the IPD corresponding to the port 3 is caused to perform the ON operation during the timer interrupt periods T1, T4 to T10, and T1 to T2, and the IPD is caused to perform the OFF operation during the timer interrupt period T3.

In this case, as shown in FIG. 23, the PWM data generation buffer table 52 can be divided into the leading phase shift portion 521, which corresponds to the timer interrupt periods T1 to T3, the no-phase-shift portion 522, which corresponds to the timer interrupt periods T4 to T9, and the trailing phase shift portion 523, which corresponds to the timer interrupt period T10 and the timer interrupt periods D1 to D2 of the phase shift excessive portion.

That is, the microprocessor 30 writes the port driving data shown in FIG. 14 all at once to the positions corresponding to the timer interrupt period T4 in the PWM data generation buffer table 52. Thereafter, in the same manner, the writing process is repeated to the positions corresponding to the timer interrupt period T9 in the PWM data generation buffer table 52.

When the duty ratio is 90%, with respect to a given port, the number of timer interrupt periods at which the data indicates "1" within the PWM period is nine. For example, with respect to the port 0, if the PWM data in the leading phase shift portion 521 is (1, 1, 1) and the PWM data in the trailing phase shift portion 523 is (0, 0, 0) as shown in FIG. 23, it is necessary for the no-phase-shift portion 522 corresponding to the port 0 to include six timer interrupt periods, i.e., the PWM data therein needs to be (1, 1, 1, 1, 1, 1), in order to achieve a 90% duty ratio. If this is the case, the total number of the cycles of the timer interrupt period included in the PWM data in the leading phase shift portion 521, the PWM data in the no-phase-shift portion 522, and the PWM data in the trailing phase shift portion 523 is 12 (=3+6+3), and the total period is longer than the PWM period. In this case, the data for the port 0 corresponding to the respective timer interrupt periods is (1, 1, 1, 1, 1, 1, 1, 1, 1, 0, 0, 0) (twelve data bits), and the data bits "0" in the phase shift excessive portion corresponding to the timer interrupt periods D1 and D2 are excessive. In this case, data corresponding to two timer interrupt periods (two cycles of the timer interrupt period) are excessive.

When phase shifting for each port is considered, with respect to the port 3 for example, if the PWM data in the leading phase shift portion 521 are (0, 0, 0) and the PWM data in the trailing phase shift portion 523 are (1, 1, 1), it is necessary for the no-phase-shift portion 522 corresponding to the port 3 to include six timer interrupt periods, i.e., the PWM data therein needs to be (1, 1, 1, 1, 1, 1), in order to achieve a 90% duty ratio. If this is the case, the total number of the cycles of the timer interrupt period included in the PWM data in the leading phase shift portion 521, the PWM data in the no-phase-shift portion 522, and the PWM data in the trailing phase shift portion 523 is 12 (=3+6+3), and the total period is longer than the PWM period. In this case, the data for the port 3 corresponding to the respective timer interrupt periods is (0, 0, 0, 1, 1, 1, 1, 1, 1, 1, 1, 1) (twelve data), and the data bits "1" in the phase shift excessive portion corresponding to the timer interrupt periods D1 and D2 are excessive. In this case, data corresponding to two timer interrupt periods are excessive.

As shown in FIG. 23, with respect to the port 0 for example, the data corresponding to the excessive timer interrupt period (D1) is "0", and the data corresponding to the first timer interrupt period (T1) in the leading phase shift portion 521 is "1". Therefore, the logical disjunction of these is "1". With respect to the port 0, the data corresponding to the excessive timer interrupt period (D2) is "0", and the data corresponding to the second timer interrupt period (T2) in the leading phase shift portion 521 is "1". Therefore, the logical disjunction of these is "1". Since the original PWM data in the leading phase shift portion 521 is (1, 1, 1), the data corresponding to the timer interrupt periods (T1, T2) in the leading phase shift portion 521 is not to be changed. In this case, the data for the port 0 corresponding to the timer interrupt periods in the PWM period is (1, 1, 1, 1, 1, 1, 1, 1, 0, 0) in order from T1 to T10. Similarly, regarding the port 1, the data corresponding to the timer interrupt periods (T1, T2) in the leading phase shift portion 521 is not to be changed.

In contrast, with respect to the port 3, the data corresponding to the excessive timer interrupt period (D1) is "1", and the data corresponding to the first timer interrupt period (T1) in the leading phase shift portion 521 is "0". Therefore, the logical disjunction of these is "1". With respect to the port 3, the data corresponding to the excessive timer interrupt period (D2) is "1", and the data corresponding to the second timer interrupt period (T2) in the leading phase shift portion 521 is "0". Therefore, the logical disjunction of these is "1". In this case, the data for the port 3 corresponding to the timer interrupt periods (T1, T2) in the leading phase shift portion 521 is changed from "0" to "1", and the PWM data in the leading phase shift portion 521 is changed from (0, 0, 0) to (1, 1, 0). Therefore, the data for the port 3 corresponding to the timer interrupt periods in the PWM period is changed to (1, 1, 0, 1, 1, 1, 1, 1, 1, 1) in order from T1 to T10, and thus correct PWM data (operation data) corresponding to the case of a 90% duty ratio can be generated. The PWM data in the leading phase shift portion 521 for the port 2 is also changed from (0, 0, 1) to (1, 0, 1).

Next, a case is described where the duty ratio is low. The case where the duty ratio is low is the case where the leading phase shift portion 521 and the no-phase-shift portion 522 cannot be used. In above-described each example, it is necessary that the duty ratio is at least 40%. In the following example, the duty ratio is lower than or equal to 30%. Note that whether or not the leading phase shift portion 521 and the no-phase-shift portion 522 can be used can be appropriately determined based on not only the duty ratio, but also depending on the number of ports, the duty resolution number, and the phase shift amount between ports.

Figure 24:
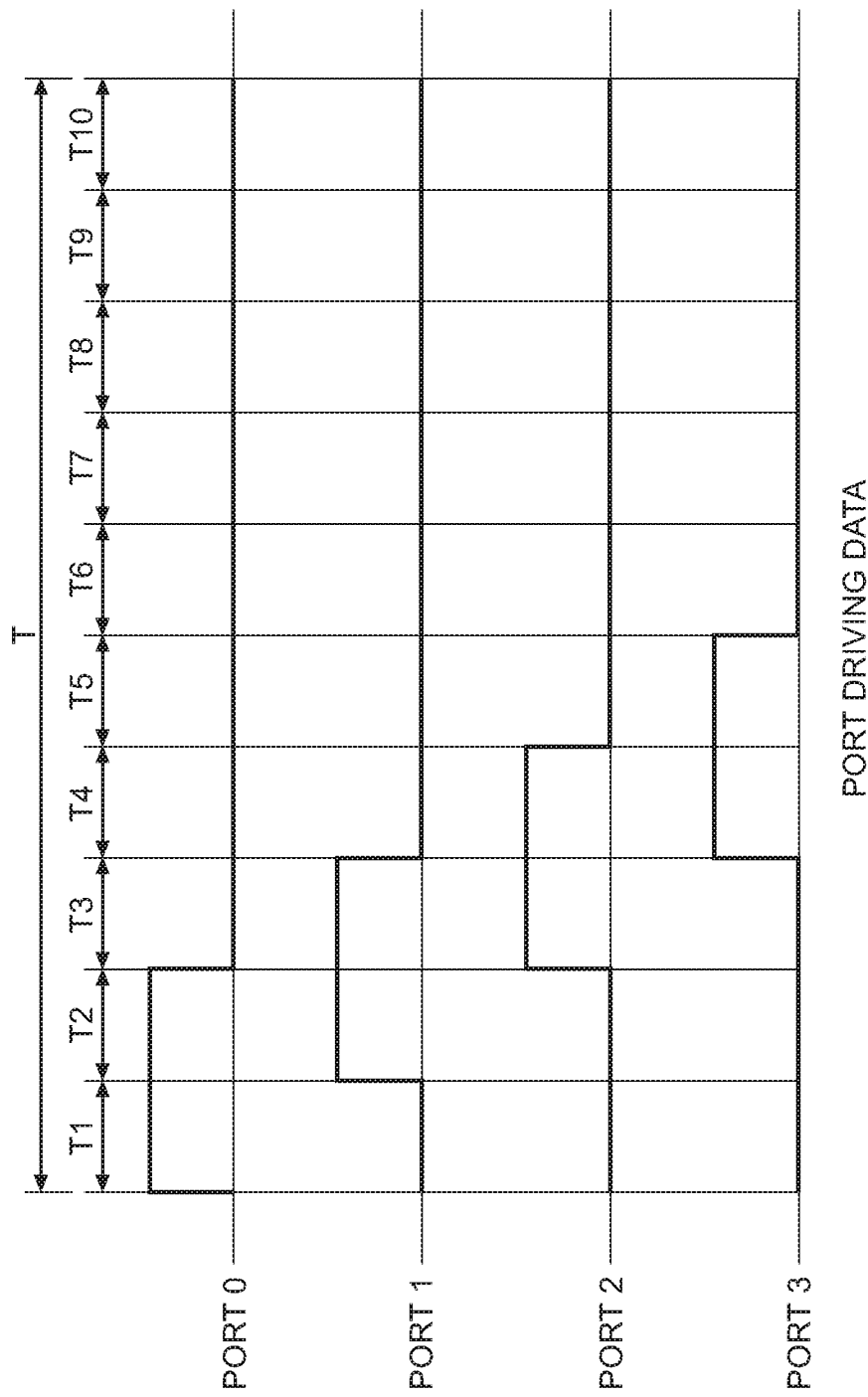
FIG. 24 is a diagram illustrating an example of PWM control performed in a case where the duty ratio is 20% and phase shifting is performed.
Figure 31:
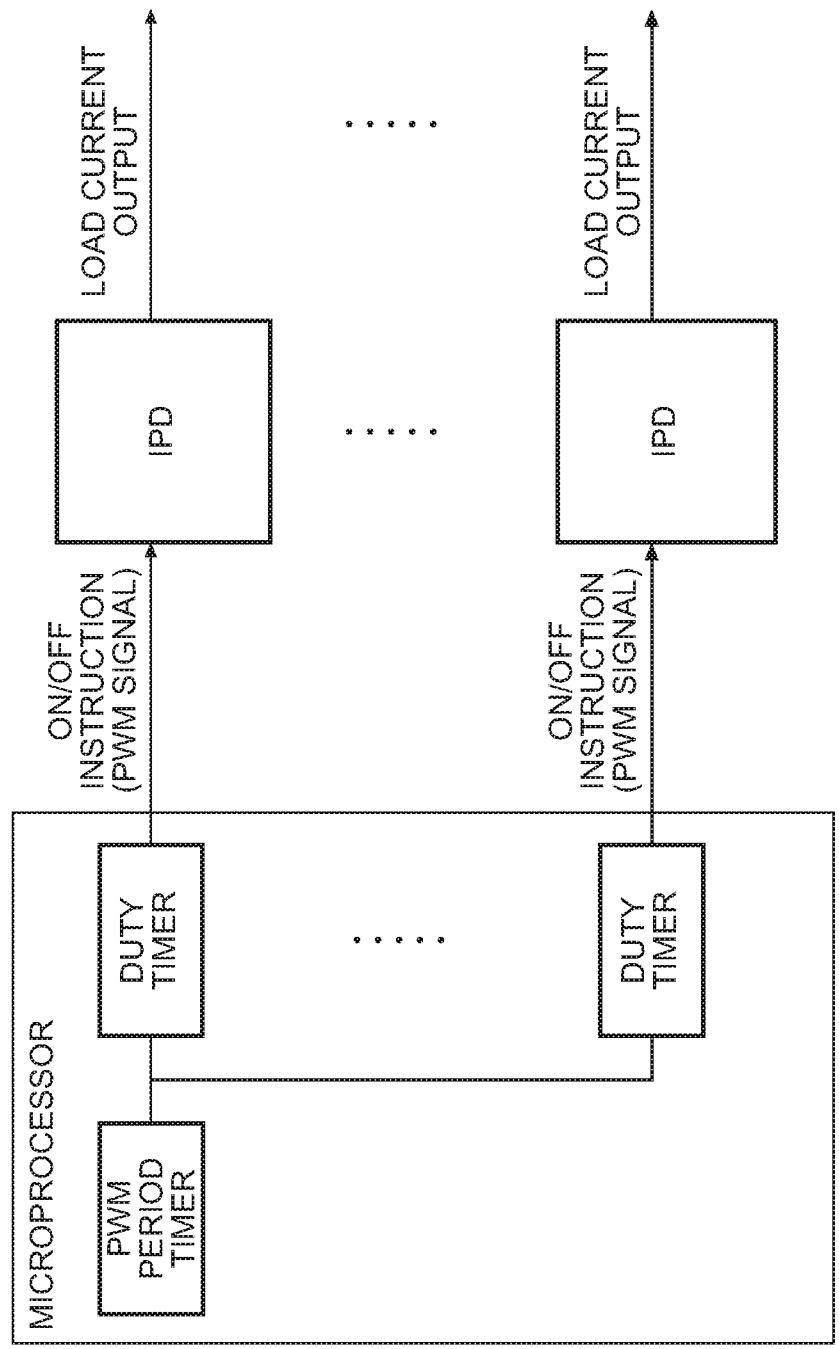
FIG. 31 is a block diagram showing a first example of a power source control device that performs conventional PWM control using a microcomputer.
Figure 32:
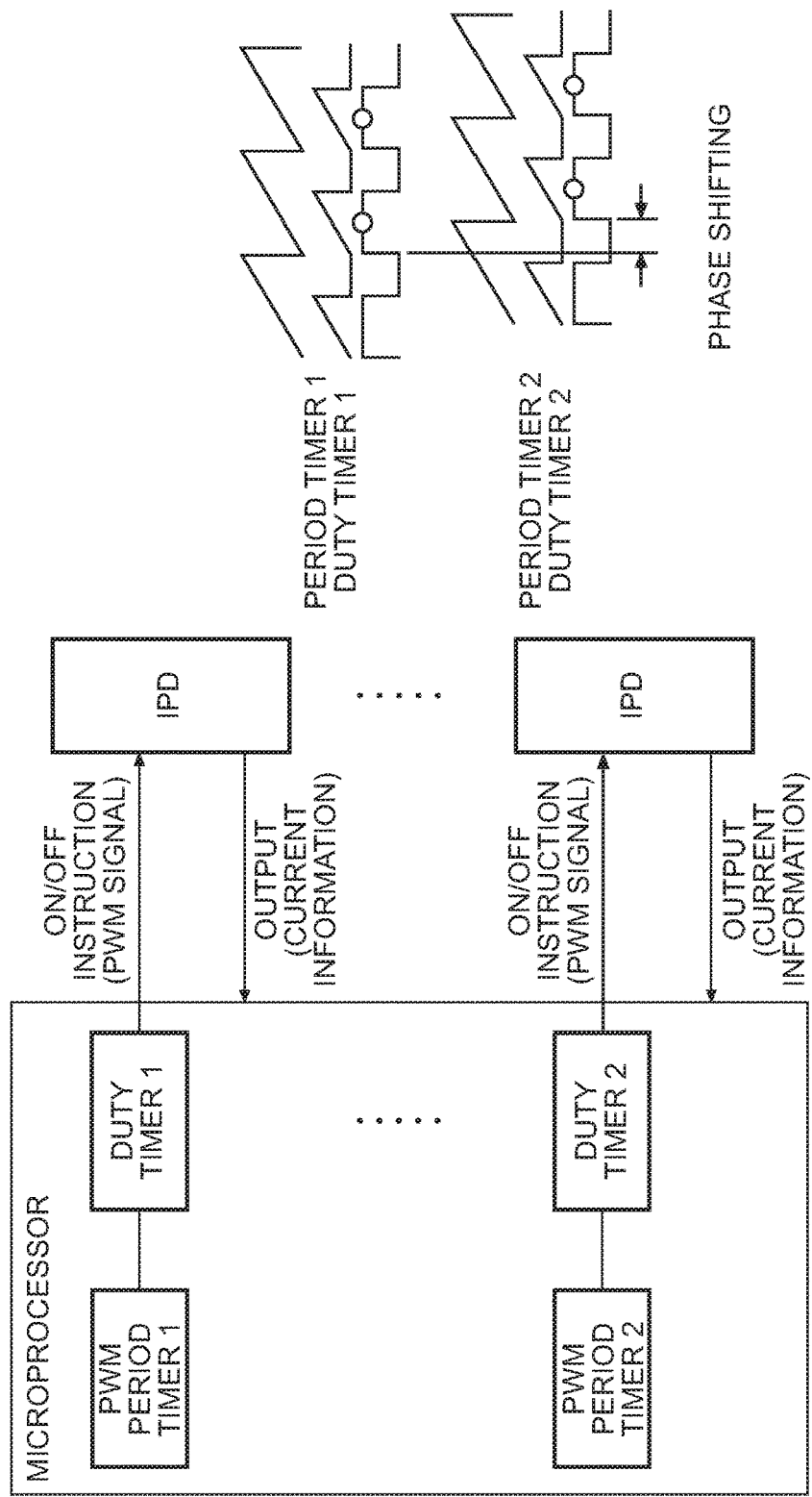
FIG. 32 is a block diagram showing a second example of a power source control device that performs conventional PWM control using a microcomputer.
Figure 33:
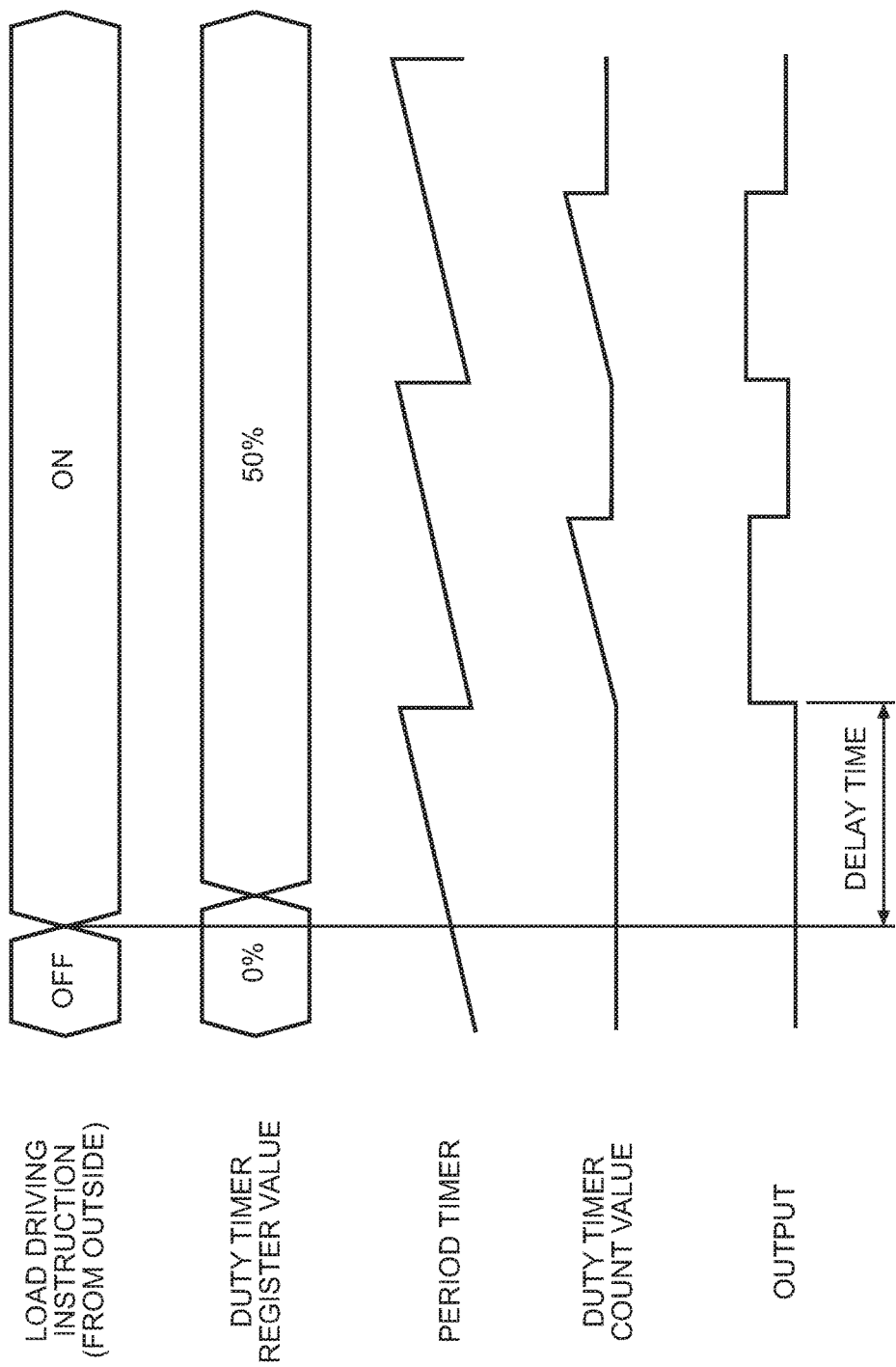
FIG. 33 is a time chart showing an example of conventional PWM control using a microcomputer.

FIG. 24 is a diagram illustrating an example of PWM control performed in the case where the duty ratio is 20% and the phase shifting is performed, and FIG. 25 is a diagram illustrating an example of PWM data generated in the PWM data generation buffer table 52 and used for performing PWM control shown in FIG. 24. Note that the PWM data generation buffer table 52 has been cleared in advance.

As shown in FIG. 24, it is assumed that the IPD corresponding to the port 0 is caused to perform the ON operation during the timer interrupt periods T1 to T2, and the IPD is caused to perform the OFF operation during the timer interrupt periods T3 to T10. It is also assumed that the IPD corresponding to the port 1 is caused to perform the ON operation during the timer interrupt periods T2 to T3, and the IPD is caused to perform the OFF operation during the timer interrupt periods T1 and T4 to T10. It is also assumed that the IPD corresponding to the port 2 is caused to perform the ON operation during the timer interrupt periods T3 to T4, and the IPD is caused to perform the OFF operation during the timer interrupt periods T1 to T2 and T5 to T10. It is also assumed that the IPD corresponding to the port 3 is caused to perform the ON operation during the timer interrupt periods T4 to T5, and the IPD is caused to perform the OFF operation during the timer interrupt periods T1 to T3 and T6 to T10.

In this case, as shown in FIG. 25, first, the port 0 is selected, "1" is written as the data for the timer interrupt periods T1 to T2, and "0" is written as the data for the timer interrupt periods T3 to T10. The same applies to the other ports. If "0" has been written into the PWM data generation buffer table 52 in advance (the PWM data generation buffer table 52 has been cleared), regarding the port 0, only "1" is written as the data for the timer interrupt periods T1 and T2. Regarding the port 1, only "1" is written as the data for the timer interrupt periods T2 and T3. Regarding the port 2, only "1" is written as the data for the timer interrupt periods T3 and T4. Regarding the port 3, only "1" is written as the data for the timer interrupt periods T4 and T5. Thus, the time required for the writing process can be reduced.

Next, the third embodiment is described in comparison with FIG. 10. FIG. 26 is a diagram illustrating an example of PWM data generated by the microprocessor 30 according to the third embodiment. In other words, the following describes how to generate the PWM data shown as an example in FIG. 26. As shown in FIG. 26, regarding the PWM data to be generated, it is assumed that the duty ratio is 95%, the duty resolution is 1% (duty resolution number is one hundred), the phase shift amount between ports is 2%, and the ports to be driven are ports 0, 2, 4 and 6.

FIG. 27 is a diagram illustrating the port driving data used for generating the PWM data shown in FIG. 26. Since the ports to be driven are ports 0, 2, 4, and 6, the port driving data bits corresponding to the ports 0, 2, 4, and 6 are "1" and those corresponding to the other ports are "0".

FIG. 28A is a diagram illustrating the phase shift data used for generating the PWM data shown in FIG. 26, and FIG. 28B is a diagram illustrating the inverted phase shift data used for generating the PWM data shown in FIG. 26. When the phase shift amount between ports is 2%, the data corresponding to adjacent ports are shifted by an amount corresponding to two timer interrupt periods. Therefore, when the number of ports is eight, the number of timer interrupt periods included in the phase shift data is 14 (=2×(8−1)). As shown in FIG. 28A, regarding the port "0", all of the $0^{th}$ to the $13^{th}$ data bits are "1". Regarding the port 1, the $0^{th}$ and the $1^{st}$ data bits are "0", and all of the $2^{nd}$ to the $13^{th}$ data bits are "1". The data for the other ports is arranged in a similar manner, and regarding the port 7, all of the $0^{th}$ to the $13^{th}$ data bits are "0".

Also, as shown in FIG. 28B, the inverted phase shift data is data in which all "0"s and "1"s in the phase shift data set are inverted to "1"s and "0"s, respectively.

Figure 29A:
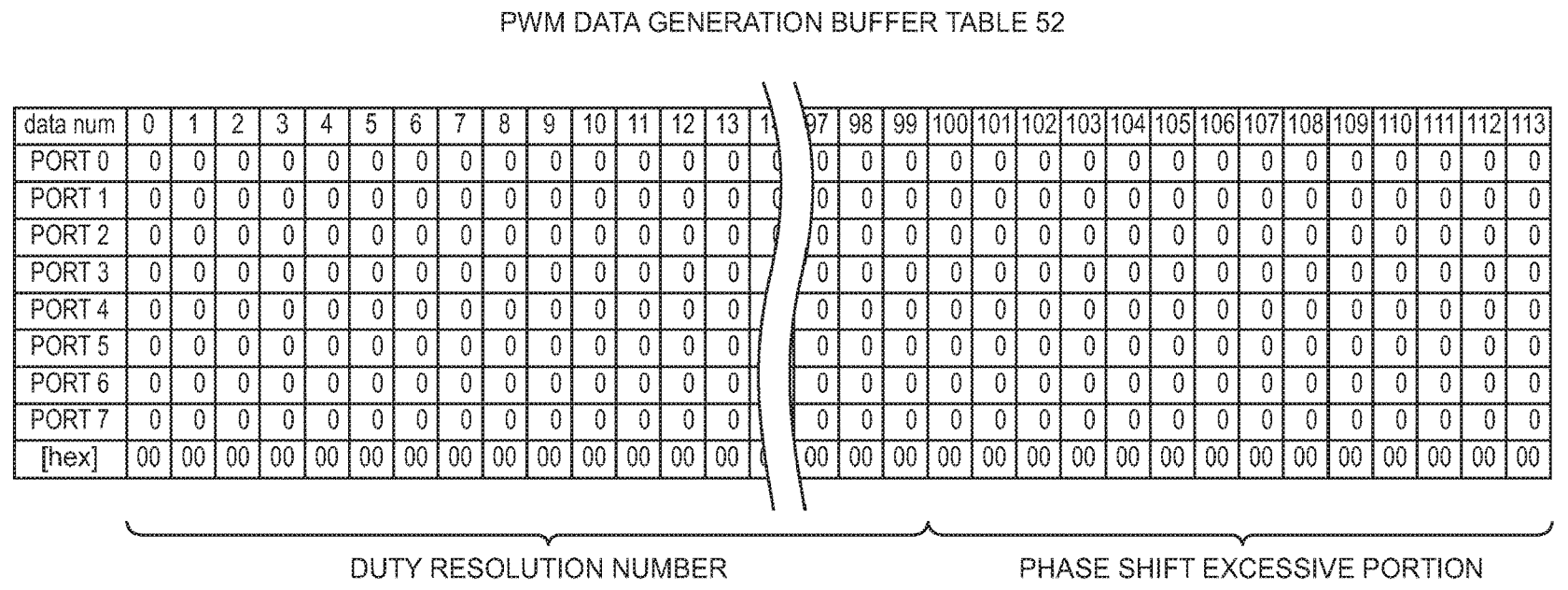

FIGS. 29A, 29B, 30A, and 30B are schematic diagrams each showing an example of an operation data generation method according to the third embodiment. FIG. 29A shows a configuration of the PWM data generation buffer table 52. The PWM data generation buffer table 52 contains a given number of entries, the given number corresponding to the number of ports of the port register 33 (in the example shown in FIGS. 29A and 29B, eight ports, namely the port 0 to the port 7). The PWM data generation buffer table 52 can hold a given number of data bits for each port, the given number being equal to the total (114) of; the number indicating the duty resolution (in the example shown in FIGS. 29A and 29B, one hundred data bits having the data numbers ([qdatanum]) 0 to 99); and the number of data bits in the phase shift excessive portion (in the example shown in FIGS. 29A and 29B, fourteen data bits having the data numbers ([qdatanum]) 100 to 113). Note that each number shown in the PWM data generation buffer table 52 corresponds to a timer interrupt period. In this way, the PWM data generation buffer table 52 can hold 800 (8×100) data bits as the PWM data (operation data) corresponding to the PWM period, and 112 (8×14) data bits in the phase shift excessive portion. Note that the number of ports and the duty resolution number are merely examples and are not limited to those shown in FIGS. 29A and 29B.

When PWM data is generated, first, as shown in FIG. 29A, the PWM data generation buffer table 52 is cleared (all the data is set to 0).

Figure 29B:
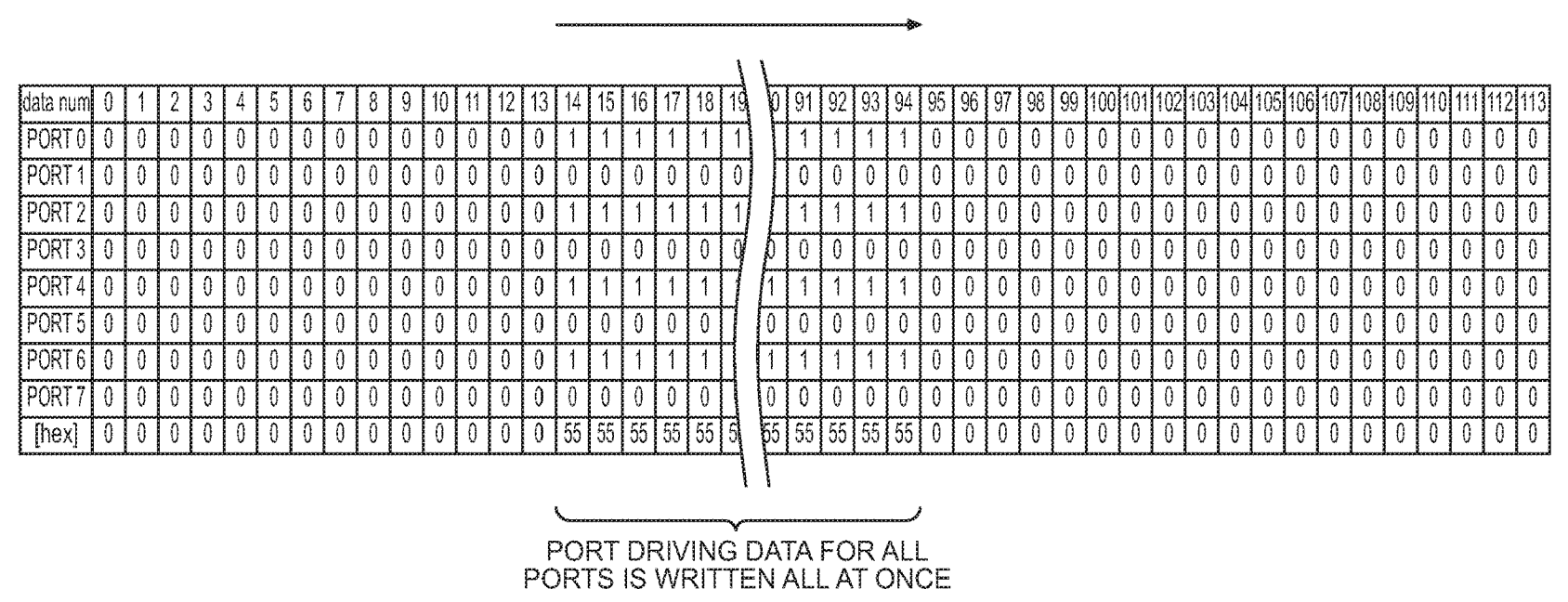

Next, as shown in FIG. 29B, the microprocessor 30 writes the port driving data shown in FIG. 27 all at once to the $14^{th}$ positions in the PWM data generation buffer table 52. Since the $0^{th}$ to $13^{th}$ positions are positions to which the phase shift data are to be written, the subsequent $14^{th}$ positions are the first positions to which the driving data is written. After completing the writing to the positions corresponding to the $14^{th}$ positions, the microprocessor 30 writes the port driving data all at once to the $15^{th}$ positions in the PWM data generation buffer table 52. Thereafter, in the same manner, the writing process is repeated to the $94^{th}$ positions in the PWM data generation buffer table 52.

Figure 30A:
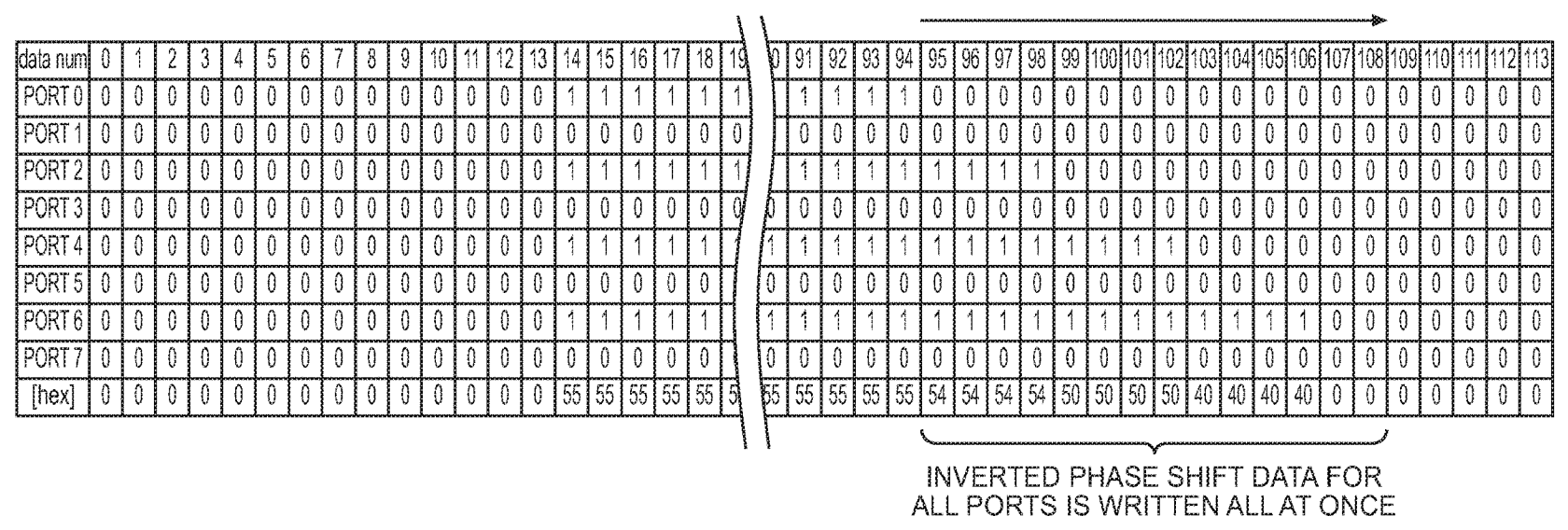

Next, as shown in FIG. 30A, the microprocessor 30 organizes the inverted phase shift data shown in FIG. 28B into data for each cycle of the timer interrupt period, and sequentially writes the sets of data from the $95^{th}$ positions to the $108^{th}$ positions. In this case, the $0^{th}$ data in the inverted phase shift data is written to the $95^{th}$ positions in the PWM data generation buffer table 52, and thereafter, in the same manner, the $13^{th}$ data in the inverted phase shift data is written to the $108^{th}$ positions in the PWM data generation buffer table 52.

Figure 30B:
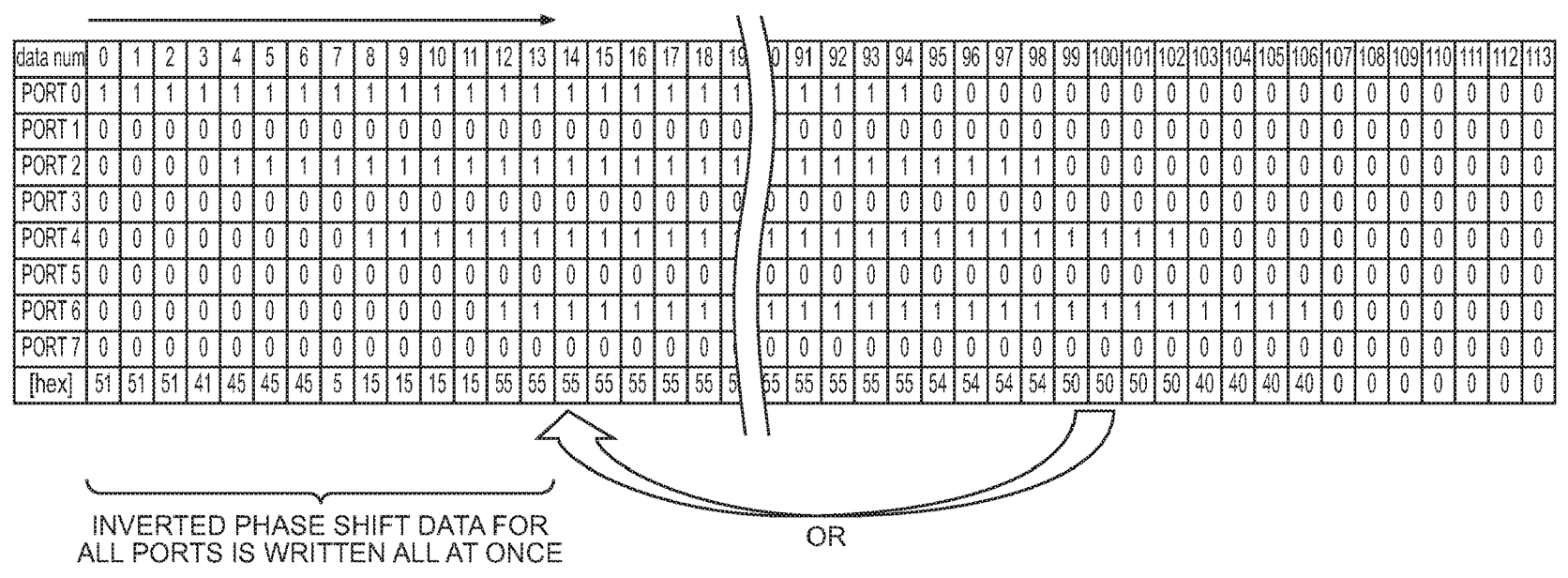

Next, as shown in FIG. 30B, the microprocessor 30 calculates the logical disjunction of; each of the $100^{th}$ to the $113^{th}$ data in the phase shift excessive portion; and the phase shift data, organizes the calculation result data into a set of data for each cycle of the timer interrupt period, and writes the sets of data from the $0^{th}$ positions to the $13^{th}$ positions in the PWM data generation buffer table 52.

Finally, out of the data generated in the PWM data generation buffer table 52, the PWM data (the $0^{th}$ to the $99^{th}$ data) other than the data in the phase shift excessive portion are stored in the memory 34. The PWM data (the operation data) are thus stored in the memory 34. Thus, the PWM data shown in FIG. 26 is generated.

As described above, it is possible to correctly generate PWM data with a desired duty ratio by only preparing simple sets of data, namely the port driving data, the phase shift data, and the inverted phase shift data. Also, it is possible to reduce the number of repetitions of the writing process by writing data for each cycle of the timer interrupt period all at once, and it is possible to reduce the time required for the writing process (time required for PWM data generation) and the load relating to the writing process, compared to the case where data is written for each port.

The invention claimed is:

1. A power source control device that performs PWM control on a plurality of power source units that repeat an ON operation and an OFF operation in cycles having a predetermined PWM period, the power source control device comprising:
   a generation unit configured to generate operation data for the entire predetermined PWM period, the operation data determining whether to cause the individual power source units to perform the ON operation or the OFF operation in cycles having a predetermined period that is shorter than the predetermined PWM period;
   an output unit configured to output the operation data generated by the generation unit to the plurality of power source units in cycles of the predetermined period;
   a storage unit configured to store the operation data generated by the generation unit; and
   a transferring unit configured to transfer operation data that corresponds to the predetermined period, out of the operation data stored in the storage unit, to the output unit in synchronization with the predetermined period.

2. The power source control device according to claim 1, wherein the generation unit is configured to generate the operation data such that ordinal numbers of the cycles of the predetermined period within the PWM period, at which the individual power source units are respectively caused to perform the ON operation for the first time, are different from each other.

3. The power source control device according to claim 1, further comprising:
   a voltage detection unit configured to detect a voltage applied to the plurality of power source units,
   wherein the generation unit is configured to increase or reduce the number of the cycles of the predetermined period within the PWM period, at which the plurality of power source units are caused to perform the ON operation, depending on the voltage detected by the voltage detection unit.

4. The power source control device according to claim 1, further comprising:
   an acquisition unit configured to acquire an instruction that specifies a duty ratio of the PWM control, at a given cycle of the predetermined period within the PWM period,
   wherein the generation unit is configured to update operation data based on the instruction acquired by the acquisition unit, and
   the output unit is configured to output operation data that has been updated by the generation unit, at a cycle of the predetermined period that is later than the given cycle.

5. The power source control device according to claim 1, further comprising:
   a plurality of current detection units that are configured to detect currents that the plurality of power source units supply to corresponding loads; and
   a control unit that is configured to let the plurality of current detection units detect the currents at predetermined cycles, at which the plurality of power source units respectively perform the ON operation, based on the operation data generated by the generation unit.

6. The power source control device according to claim 1, wherein the generation unit includes:
   a predetermined table; and
   a writing unit configured to organize the operation data into sets of data respectively corresponding to the predetermined period, and write the sets of operation data one after another into the table, and
   the power source control device is configured to store, in the storage unit, the sets of operation data written into the predetermined table.

7. The power source control device according to claim 6, wherein the generation unit further includes:
   a leading data generation unit that is configured to generate leading operation data for causing the plurality of power source units to perform an initial ON operation one after another in cycles of the predetermined period in a leading portion of the PWM period;
   a trailing data generation unit that is configured to generate trailing operation data for causing the plurality of power source units to perform an initial OFF operation one after another in cycles of the predetermined period in a trailing portion of the PWM period; and
   an intermediate data generation unit configured to generate intermediate operation data for causing the plurality of power source units to perform the ON operation in cycles of the predetermined period in an intermediate portion between the leading portion and the trailing portion, and
   the writing unit is configured to organize the leading operation data, the intermediate operation data, and the trailing operation data into sets of data respectively corresponding to the predetermined period, and write the sets of operation data one after another into the table.

8. The power source control device according to claim 7, wherein the intermediate data generation unit is configured to adjust the number of cycles of the predetermined period included in the intermediate operation data in accordance with a duty ratio of the PWM control.

9. The power source control device according to claim 7, further comprising:
   a period determination unit configured to determine whether or not a sum total of the cycles of the predetermined period included in the leading operation data, the intermediate operation data, and the trailing operation data is longer than the predetermined PWM period; and a logical disjunction calculation unit configured to, upon the period determination unit determining that the sum total of the cycles of the predetermined period is longer than the PWM period, calculate, for each predetermined period, a logical disjunction of the trailing operation data and the leading operation data that correspond to an excessive period by which the sum total is longer, in the order of the cycles of the predetermined period, wherein the leading data generation unit is configured to generate data obtained by the logical disjunction calculation unit as the leading operation data.

10. A power source control method for performing PWM control on a plurality of power source units that repeat an ON operation and an OFF operation in cycles having a predetermined PWM period, the power source control method comprising the steps of:

generating operation data for the entire predetermined PWM period, the operation data determining whether to cause the individual power source units to perform the ON operation or the OFF operation in cycles having a predetermined period that is shorter than the predetermined PWM period;

outputting operation data thus generated to the plurality of power source units in cycles of the predetermined period;

storing the operation data generated by a generation unit in a storage unit; and transferring the operation data that corresponds to the predetermined PWM period, out of the operation data stored in the storage unit, to an output unit in synchronization with the predetermined period.

* * * * *